(12) United States Patent
Cate et al.

(10) Patent No.: US 8,657,254 B2
(45) Date of Patent: Feb. 25, 2014

(54) FLUID RELEASE VALVE USING FLEXIBLE FLUID PERMEABLE MEMBRANE

(75) Inventors: Lynn Roland Cate, Hamilton (NZ);
Robert Bruce Jordan, Hamilton (NZ);
Dean Antony Barker, Hamilton (NZ);
Keith Robert Sharrock, Hamilton (NZ);
Mark Francis Roche, Ohaupo (NZ);
Ronald Francis Henzell, Hamilton (NZ)

(73) Assignee: The New Zealand Institute for Plant and Food Research Limited, Mr. Albert, Aukland (NZ)

( * ) Notice: Subject to any disclaimer, the term of this patent is extended or adjusted under 35 U.S.C. 154(b) by 949 days.

(21) Appl. No.: 12/446,220

(22) PCT Filed: Oct. 18, 2007

(86) PCT No.: PCT/NZ2007/000312
§ 371 (c)(1),
(2), (4) Date: Jul. 27, 2009

(87) PCT Pub. No.: WO2008/048122
PCT Pub. Date: Apr. 24, 2008

(65) Prior Publication Data
US 2010/0319249 A1 Dec. 23, 2010

(30) Foreign Application Priority Data
Oct. 18, 2006 (NZ) .................................. 550636

(51) Int. Cl.
*F16K 31/00* (2006.01)
*A23K 3/02* (2006.01)
*A01H 3/04* (2006.01)
*F16K 15/14* (2006.01)

(52) U.S. Cl.
USPC ......... 251/61.1; 137/843; 426/419; 47/58.1 R

(58) Field of Classification Search
USPC ........... 426/106–131, 419; 137/843; 251/61.6
See application file for complete search history.

(56) References Cited

U.S. PATENT DOCUMENTS

| 4,764,389 A | * | 8/1988 | LaBarge | 426/312 |
| 4,890,637 A | * | 1/1990 | Lamparter | 137/246 |
| 5,316,718 A | * | 5/1994 | Sekhar | 419/19 |

(Continued)

FOREIGN PATENT DOCUMENTS

| EP | 1 547 466 A2 | 6/2005 |
| GB | 1 268 934 | 3/1972 |

(Continued)

*Primary Examiner* — Kimberly Berona
*Assistant Examiner* — Joshua Huson
(74) *Attorney, Agent, or Firm* — Knobbe, Martens, Olso & Bear, LLP

(57) ABSTRACT

A gas release device that includes a reservoir of pressurised gas and a passageway from said reservoir to an outlet. There is an elastic gas permeable membrane in the passageway that allows gas release only via the membrane. A gas impermeable member is provided in the passageway that includes an interface positioned to contact said gas permeable membrane. Displacement of the gas permeable membrane is responsive to the pressure of the gas in the reservoir such that there is a greater interfacial contact between the gas impermeable member and the gas permeable membrane at a higher gas pressure than at lower pressure to thereby vary the exposed cross sectional area of the permeable membrane available to the flow in an inverse relationship to pressure.

56 Claims, 16 Drawing Sheets

(56) References Cited

U.S. PATENT DOCUMENTS

| | | | |
|---|---|---|---|
| 6,013,293 A * | 1/2000 | De Moor | 426/106 |
| 6,619,311 B2 * | 9/2003 | O'Connor et al. | 137/109 |
| 6,840,982 B2 * | 1/2005 | Kunstadt et al. | 95/47 |
| 7,866,258 B2 * | 1/2011 | Jorgensen et al. | 99/468 |
| 8,092,848 B2 * | 1/2012 | Clarke | 426/118 |
| 8,110,232 B2 * | 2/2012 | Clarke | 426/106 |
| 2005/0045480 A1 | 3/2005 | Krumme | |
| 2007/0259082 A1 * | 11/2007 | Clarke et al. | 426/392 |

FOREIGN PATENT DOCUMENTS

| | | |
|---|---|---|
| GB | 2 394 882 A | 5/2004 |
| GB | 2 400 299 A | 10/2004 |
| JP | 2002-136257 A | 5/2002 |
| WO | 91/11913 A1 | 8/1991 |
| WO | 2006/108420 A1 | 10/2006 |

* cited by examiner

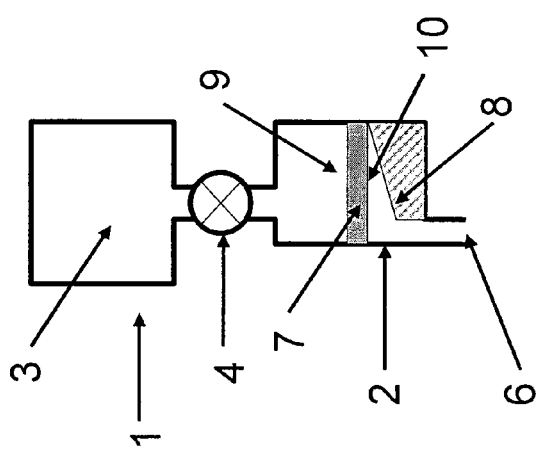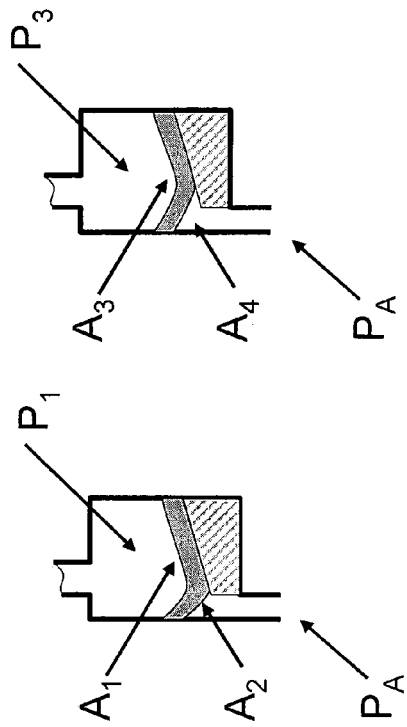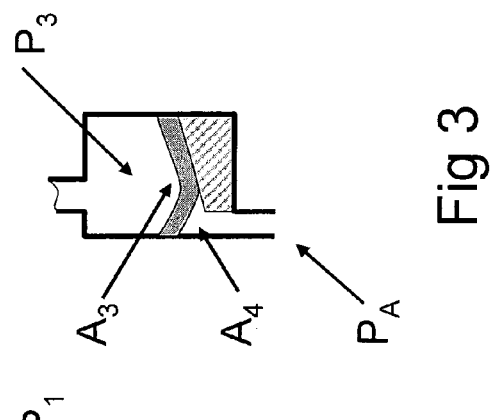
Fig 1
Fig 2
Fig 3
Legend
- Reservoir pressure, $P_1$
- Atmospheric pressure $P_A$
- Reduced reservoir pressure, $P_3$
- Adsorption area, $A_1$
- Adsorption area, $A_3$
- Desorption area, $A_2$
- Reduced desorption area, $A_4$
Functional description
$P_1 > P_A$
$P_3 > P_A$
$P_3 < P_1$
$A_3 = A_1$
$A_2 < A_4$

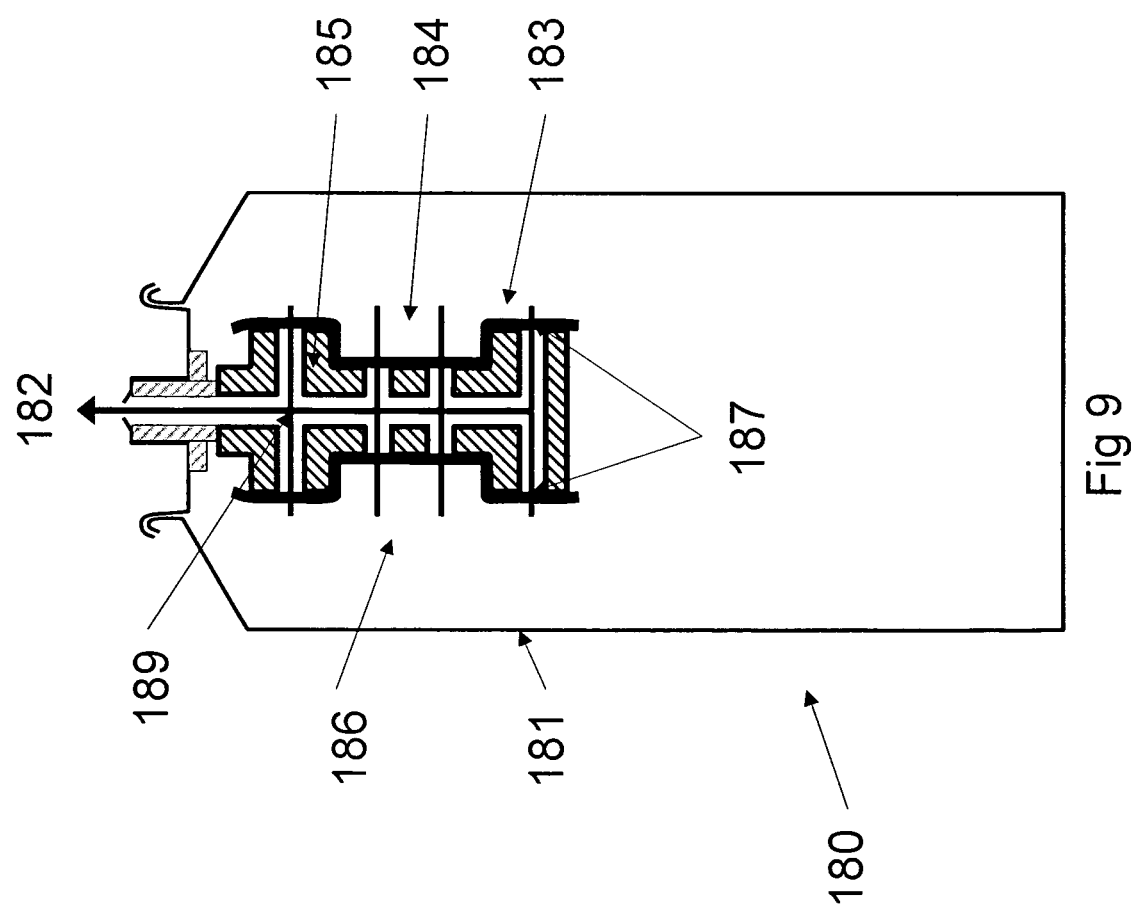

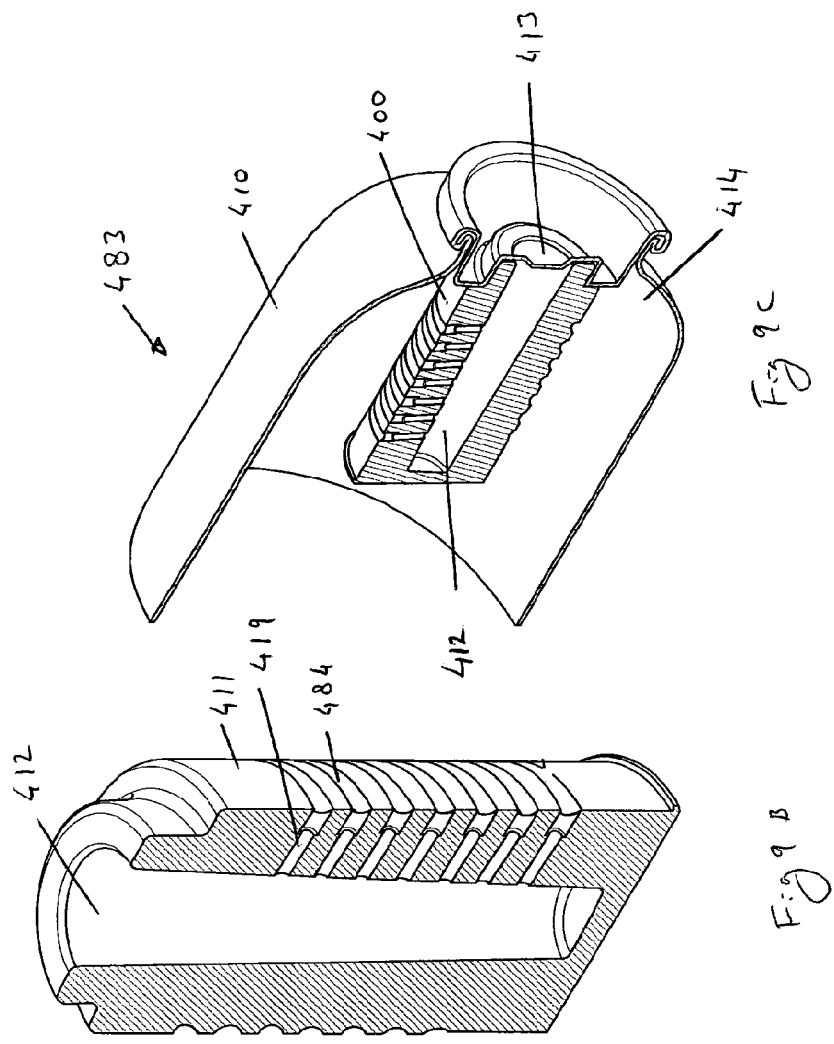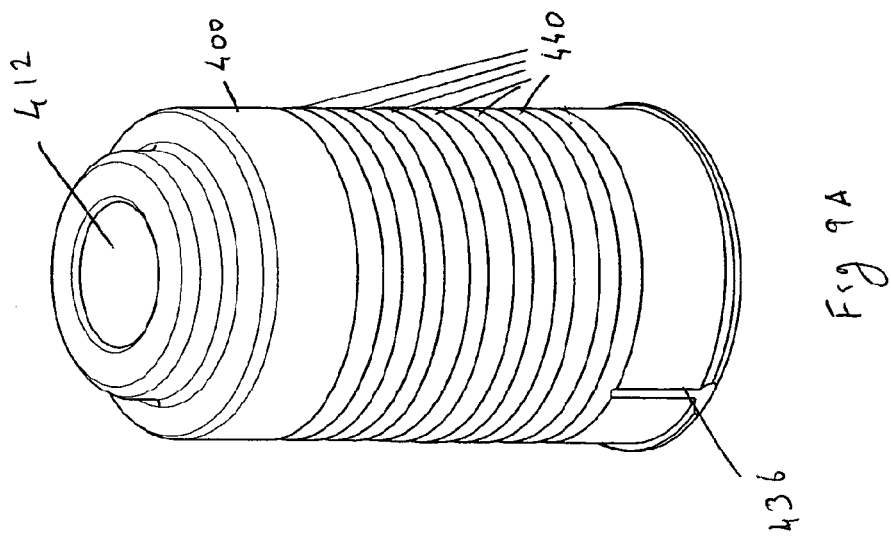

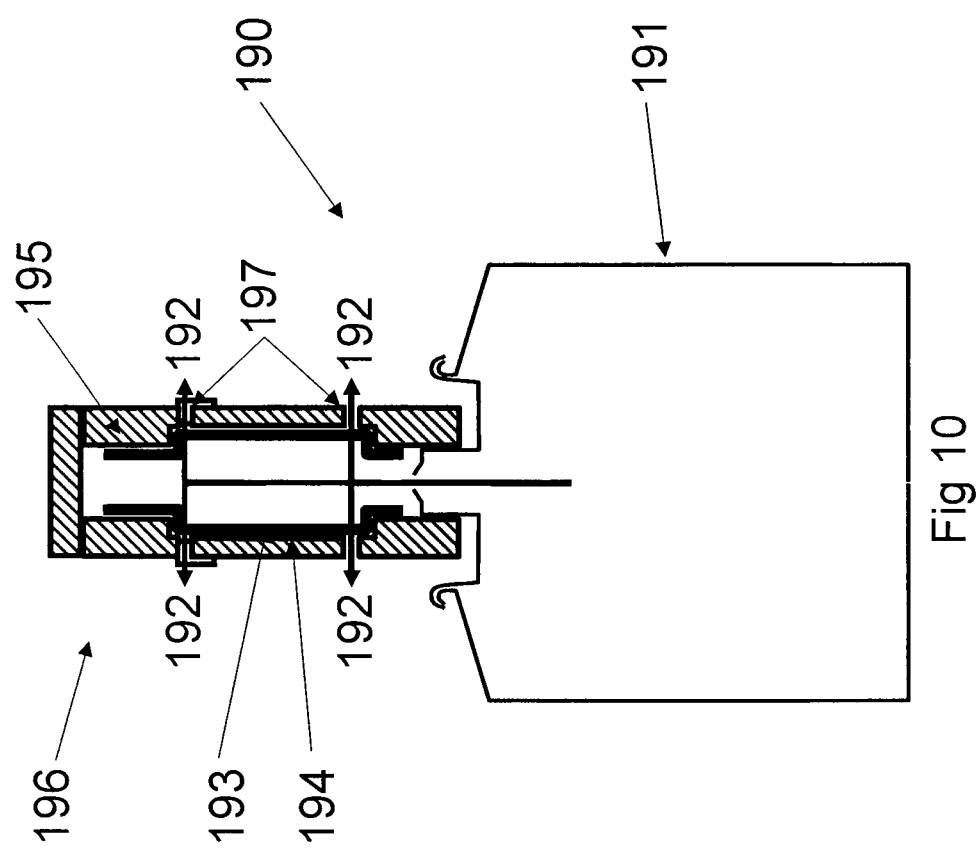

FLUID RELEASE VALVE USING FLEXIBLE FLUID PERMEABLE MEMBRANE

This application is U.S. National Phase of International Application PCT/NZ2007/000312, filed Oct. 18, 2007 designating the U.S., and published in English as WO 2008/048122 on Apr. 24, 2008, which claims priority to New Zealand Patent Application No. 550636, filed Oct. 18, 2006.

The present invention relates to a fluid release device and in particular but not solely to an ethylene release device and to related methods for conditioning plant material.

BACKGROUND TO THE INVENTION

Ethylene is a well known fruit ripening agent (Kays, S. and Beaudry, R. Acta Horticulturae 201: 77-115 (1987)). It has been widely used in gas form for post-harvest fruit ripening. Ethylene-containing conditioning rooms are used for ripening fruit and vegetables in bulk.

As well as ethylene per se, a large number of ethylene releasing compounds have also been used in ripening processes (Kays, S. and Beaudry supra.). These ethylene releasing compounds generally include a haloethyl group attached to a sulphur, phosphorus, or silicon atom. Their operation may be pH dependent and toxic breakdown products may be produced when used. Such compounds are primarily employed for pre-harvest plant conditioning applications.

Packaging and devices useful in post harvest fruit ripening are also known. For example, U.S. Pat. No. 3,069,274 describes a foam protector for fruit, impregnated with ethylene halides such as ethylene dichloride for fruit ripening. The use of ethylene halides in packaging is contraindicated where they produce irritating vapours that can blister skin and cause serious pulmonary damage, corneal clouding, and liver and kidney damage to people.

U.S. Pat. No. 5,525,130 describes a label device consisting of a two compartment capsule. The compartments are separated by a rupturable membrane and contain compositions that when combined release ethylene. For example, (2-chloroethyl)phosphoric acid and a base. The device is expensive and the compartment components are known skin and eye irritants.

Capsules containing ethylene gas for fruit ripening are also described in Ma et al., Journal of Fruit Quality: 23 (200) 245-259. These are impractical, large volume, plugged capsules which require plug or cap removal to allow ethylene release in packaging. Moreover, gas release is relatively rapid and non-linear.

Accordingly, there is a need for an ethylene release device that is capable of releasing ethylene without production of undesirable products. There is also a need for an ethylene release device that is of a size and type suited to inclusion in packaging. There is also a need for an ethylene release device that can appropriately control the desired rate of release of ethylene.

It is therefore an object of this invention to provide a fluid release device and related methods suitable for use in conditioning plant material which addresses at least one of the abovementioned limitations, or which may at least provides the public with a useful choice.

It may also be an object of this invention to provide a fluid release device that addresses at least some of the abovementioned limitations or which may at least provide the public with a useful choice.

Accordingly the present invention may consist in a fluid flow control valve, suitable for controlling the flow rate of fluid to the surrounding environment from a fluid storage reservoir that includes a fluid outflow passage for fluid that is at a higher pressure inside of said reservoir than the surrounding environment, said fluid flow control valve comprising:

an elastic fluid permeable membrane to control the flow of fluid through said passage, said membrane comprising an absorption surface to absorb a fluid from the reservoir into said membrane, and a desorption surface to desorb a fluid from said membrane to the surrounding environment;

wherein said membrane is subjected to pressure proportional to the pressure differential between the reservoir and the surrounding environment, to vary its characteristics by virtue of its elastic nature to thereby vary the effective fluid flow path between the reservoir and the surrounding environment.

Preferably the membrane is configured to passively transition between:

a more pressurised condition where a pressure is applied by the fluid in the reservoir to the membrane to bias the membrane against a flow path restrictor in a manner to define an effective fluid flow path through said membrane that is of greater resistance to the flow of fluid from said reservoir; and a less pressurised condition where a reduced pressure is applied by the fluid in the reservoir to the membrane to bias the membrane against a flow path restrictor in a manner define an effective fluid flow path through said membrane that is of a of lower resistance to the flow of fluid from said reservoir.

Preferably the pressure of the fluid in the reservoir may communicate with said membrane via a piston having its displacement controlled by the pressure differential between the reservoir and the surrounding environment.

Preferably the effective fluid flow path is defined by the surface area of the membrane available for the absorption of fluid from the fluid reservoir and/or the surface area of the membrane available for the desorption of fluid to the surrounding environment.

Preferably at least one of the absorptive surface area and desorptive surface area of the membrane increases proportionate to a decreased pressure applied to the membrane by the fluid in said reservoir as the fluid in the reservoir depletes.

Preferably the fluid permeable membrane is a gas permeable deformable elastomer.

Preferably it is in the shape of an O-ring.

Preferably the fluid permeable membrane may comprise a plurality of gas permeable deformable elastomeric components, such as O-rings.

Preferably the device further comprises:

a flow path restrictor to define the effective fluid flow path and that includes an orifice configured to offer a variable effective size, wherein variation in effective size occurs as a result of an interaction between the membrane and the flow path restrictor, and wherein the fluid in the reservoir is in operative contact with said membrane and directly communicates the pressure of the fluid to said membrane proportionate to the pressure differential across said membrane.

Preferably the flow path restrictor includes a recess in communication with an edge of said orifice.

Preferably the recess may comprise a shaped portion of at least part of an edge of said orifice.

Preferably in use, a biasing of the membrane occurs to bring the desorptive surface of said membrane into contact with at least one of said flow path restrictor to reduce the effective fluid flow path defined by said orifice.

Preferably the area of the desorptive surface of the membrane in contact with at least one of the flow path restrictors is inversely proportionate to the pressure differential between the fluid in the reservoir and the surrounding environment.

Preferably the membrane is sensitive to the pressure applied to the membrane to vary the permeability of fluid through the membrane to thereby at least in part control the effective fluid flow path characteristics.

Preferably the membrane is selected from the group comprising elastomeric polymers such as silicone, synthetic hydrocarbons and natural rubber and combinations thereof.

Preferably the fluid is a gas.

Preferably the gas is ethylene, propylene, methyl cyclopropene, pyrethrin/sythetic pyrethroids, ethylene oxide, methyl bromide, carbon dioxide, or sulphur dioxide or any similar gas or gas mixture containing one of these gasses as an ingredient.

Preferably the gas may have anaesthetics, propulsion, aroma, flavour, fragrance, pheromone, fumigant, pesticide and/or corrosive properties.

Preferably the fluid flow control valve provides a substantially linear fluid flow rate profile over a substantial portion of time of discharge of fluid from said reservoir.

Preferably the fluid flow control valve provides a final rapid release of residual fluid in said reservoir at a predetermined pressure differential.

In a further aspect the present invention consists in a fluid release device that comprises a reservoir with which there is associated a fluid flow control valve as herein before described.

In still a further aspect the present invention consists in a method for conditioning plant material comprising the steps of:

containing a plant material in an environment that is at least partially gas-tight;

exposing the plant material to fluid released from a fluid release device as herein before described to condition the plant material.

Preferably the at least partially gas tight environment comprises an outer cover, desirably said cover serves to substantially limit the mass transport of gases to permit an accumulation of ethylene gas internally while remaining sufficiently permeable to respiratory gases such as carbon dioxide and oxygen to maintain a beneficial environment for fruit to be receptive to ethylene.

In still a further aspect the present invention consists in a method for conditioning plant material comprising the step of exposing the plant material to a concentration of ethylene gas between about 1 ppm to about 250 ppm for time between around 0.5 day to 14 days.

Preferably, in the case of said plant material being pears or bananas, the range is maintained between 100 ppm and 200 ppm for 2 to 5 days.

Preferably the method is performed during the transit of said plant material between two locations.

In still a further aspect the present invention consists in a fluid release valve comprising a fluid permeable membrane provided between a fluid storage reservoir and the surrounding environment, said membrane configured to control at least one of:

the rate of absorption of the fluid onto the surface of the membrane;

the rate of permeation of the fluid through the membrane; and the rate of desorption of the fluid from the surface of the membrane to the environment.

In yet a further aspect the present invention consists in a fluid release valve suitable for regulating a flow of fluid from a fluid reservoir, said fluid release valve comprising a body member including:

(i) an inlet, and (ii) an outlet in fluid communication with the inlet via a flow passage;

(iii) a fluid permeable membrane extending across the flow passage to restrict the flow of fluid between said inlet and outlet; and (iv) an impervious flow path restrictor;

wherein the flow path restrictor and the membrane are configured and adapted operationally to interact with each other to allow the flow of fluid along the flow path as a function of the quantity of fluid in the fluid reservoir.

Preferably the flow rate of fluid along the flow path may be controlled by the interaction of the flow path restrictor and the membrane to be substantially constant.

Preferably it includes a closure member for closing the flow passage so that no fluid may flow through it.

Preferably it includes the fluid reservoir.

Preferably the flow path restrictor is displaceable between a restricted barrier position in which it is engaged more with said membrane whereby the fluid flow passage is more restricted, and a less restricted barrier position in which it is engaged less with said membrane whereby the fluid flow passage is less restricted.

Preferably the membrane is displaceable between a restricted barrier position in which it engages more with said flow path restrictor whereby the fluid passage is more restricted, and a less restricted barrier position in which it is engaged less with said flow path restrictor whereby the fluid flow passage is less restricted.

Preferably the fluid reservoir is pressurised in relation the surrounding environment and the membrane and flow path restrictor interact with each other to vary the effective flow path through said passage by virtue of the pressurised fluid.

Preferably the interaction of the flow path restrictor and the membrane is such that the flow path is more restricted when the pressure in the fluid reservoir is high, and the flow path is less restricted when the pressure in the fluid reservoir is relatively lower.

Preferably the flow rate of fluid along the flow path is controlled by the interaction of the flow path restrictor and the membrane to be substantially constant over time until the quantity of fluid in the fluid reservoir has reached a predetermined lower threshold, after which the flow path is not restricted by the interaction of the membrane and/or the flow path restrictor, and an uninterrupted passage is established between any remaining fluid in the reservoir and the surrounding environment.

Preferably the flow path restrictor is located adjacent the membrane to allow a variable amount of contact therebetween to vary the permeation of fluid through the membrane.

Preferably the flow path restrictor is disposed proximal more the inlet of the passage relative the membrane, said flow path restrictor presented to interact with said membrane to influence the absorbtion of fluid into the membrane.

Preferably the flow path restrictor is disposed proximal more the outlet of the passage relative the membrane to interact with said membrane to influence the desorbtion of fluid from said membrane.

Preferably the flow path restrictor and the membrane can move relative to each other and come into variable degree of contact to deform the membrane so as to restrict permeation of the fluid through the membrane.

Preferably the membrane is composed of an elastically resilient material.

Preferably the membrane is composed of material selected from the group of elastomeric polymers such as silicone, synthetic hydrocarbons and natural rubber and any combinations thereof.

Preferably the flow path restrictor is of a non permeable material.

Preferably the flow path restrictor is composed of an inelastically resilient material.

Preferably the fluid in the fluid reservoir is a gas.

Preferably the gas is selected from of ethylene, propylene, methyl, cyclopropene, pyrethin or synthetic pyrethroids, ethylene oxide methyl bromide, pheromones, fumigants, pesticides, carbon dioxide, sulphur dioxide or any similar gas or gas mixture containing one of these gases as an ingredient.

Preferably the gas may include anaesthetic, propulsion, fragrance, aroma, flavour, and corrosive properties.

Preferably the membrane is in the form of a planar film.

Preferably, the membrane is a hollow sheath.

Preferably the flow path restrictor is defined by a body having a cavity that is in fluid communication with the surrounding environment and with at least one opening to the cavity that is in fluid communication with said fluid in said reservoir via said membrane.

Preferably the body includes a hollow cylindrical portion.

Preferably the hollow sheath is configured and dimensioned to fit snugly around at least part of the cylindrical portion and fluid pressure can act on the sheath to bias it against the hollow body.

Preferably formed at the cylindrical region is at least one annular channel into which the membrane, under pressure from said fluid may be forced yet be resiliently biased in a direction out of the channel.

Preferably the cylindrical region includes a plurality of annular channels.

Preferably the fluid pressure can act against the sheath's elasticity to encourage the sheath to (a) conform to the channel or channels at higher reservoir fluid pressures, thereby restricting the flow of fluid through the apertures in the hollow tube; and (b) retract at least partially from contact with the channel or channels at lower pressures thereby reducing the restriction on the fluid flow.

Preferably the body includes a pressure release passage formed into an outer surface of the body and with which said sleeve can interact to become compliant therewith under higher fluid pressure thereby closing said passage and which can enable unrestricted fluid communication of the fluid reservoir with the surrounding environment at a predetermined lower fluid threshold pressure.

Preferably the flow path restrictor may include a cylindrical piston movable within a cylindrical bore in the body member.

Preferably comprises an annular ring.

Preferably the annular ring is of a cross sectional shape which is circular, triangular, square, polygonal, or any other shape.

Preferably a piston is configured to press against the annular ring under pressure of the pressurised fluid.

Preferably the body member includes an inner annular lip against which the annular ring may be pushed by the piston.

Preferably the piston is configured to press the annular ring against the annular lip under pressure of the pressurised fluid, thereby deforming the annular ring.

Preferably the increased deformation of the annular ring at high pressure will restrict the flow of fluid through the permeable annular ring, and the decreased deformation of the annular ring at lower pressures allows a more unrestricted flow of fluid through the permeable annular ring.

Preferably the fluid release valve includes a plurality of annular rings.

Preferably each of the plurality of annular rings is spaced apart by impermeable spacing members.

Preferably the annular ring may be an O-ring.

Preferably he fluid release valve, in use, provides a substantially linear fluid flow profile over a substantial portion of time of operation of the device.

In a further aspect the present invention consists in a method for conditioning plant material comprising the steps of:

providing a fluid release valve as herein before described that is associated with a pressurised fluid reservoir in an environment that is at least partially fluid-tight and that contains plant material;

exposing the plant material to fluid from the fluid release valve over a time period.

Preferably the time period is between 0.5 to 14 days.

Preferably the time period is 5 days.

Preferably the fluid released by the fluid release valve is ethylene.

Preferably the at least partially fluid-tight environment comprises a covered container that restricts the dispersion of the gas to permit an accumulation of ethylene gas internally while remaining sufficiently vented to the air so as to maintain a beneficial environment for fruit to be receptive to ethylene.

Preferably the plant material is retained in the environment with a concentration of ethylene gas of between about 1 ppm to about 250 ppm for a time period of between half a day to 7 days.

Preferably the plant material is retained in the environment with a concentration of ethylene gas of between about 100 ppm and 200 ppm for 2 to 5 days.

In yet a further aspect the present invention consists in a method of conditioning plant material in transit comprising the steps of at least partially enclosing the plant material in an isolated environment;

loading the plant material onto a transportation means;

providing a fluid release valve as herein before described that is associated with a pressurised fluid reservoir, within the cover;

retaining the plant material in the isolated environment that includes fluid released by the fluid release valve from said reservoir over a period of time.

Preferably the plant material is a fruit.

In still a further aspect the present invention consists in a gas release device comprising or including a reservoir of pressurised gas to be released, a passageway from said reservoir to an outlet, an elastic gas permeable membrane in the passageway and/or at the outlet that allows gas release only via the membrane to, or from, the outlet, and a gas impermeable member in said passageway that includes a gas permeable member interface positioned to contact said gas permeable membrane, wherein displacement of the gas permeable membrane is responsive to the pressure of the gas in the reservoir such that there is a greater interfacial contact between the gas impermeable member and said gas permeable membrane at a higher gas pressure than at lower pressure to thereby vary the exposed cross sectional area of the permeable membrane available to the flow in an inverse relationship to pressure.

Preferably the gas permeable membrane is elastic.

Preferably the gas impermeable member is rigid.

Preferably the gas permeable membrane elasticity at the interface is to reduce the interfacial contact with said gas impermeable member as the pressure decreases.

Preferably the gas permeable membrane is responsive in a progressive manner.

In still a further aspect the present invention consists in a method of packaging fruit comprising, placing in a container that holds or is to hold fruit, a cartridge containing a fixed quantity of ethylene that can be activated to release ethylene at a constant flow rate over a period of time and activating the cartridge and shipping the container with fruit contained therein to a destination.

In yet a further aspect the present invention consist in a container containing fruit that includes a cartridge containing a fixed quantity of ethylene that can be activated to release ethylene at a constant flow rate over a period of time and activating the cartridge and shipping the container with fruit contained therein to a destination.

In even a further aspect the present invention consists in a self contained gas release device that can release a gas at a constant flow rate over a period of time, said device comprising;

a pressure vessel that contains a gas to be discharged there from, a valve for said pressure vessel to control the discharge of gas from said pressure vessel, said valve comprising (a) a body that defines (i) an aperture for discharging gas to pass through to the environment surrounding said device and (ii) a control surface (b) an elastic gas permeable membrane interposing direct gas flow from said pressure vessel to said aperture so that gas must permeate through said membrane in order to discharge from said pressure vessel, said membrane located adjacent said control surface to, at lower gas pressure of said gas, form a passage between said control surface and said aperture that is of a greater size than at higher gas pressure where said membrane is more compliant to the shape of the control surface by virtue of a higher gas pressure biasing the membrane against said control surface.

In a further aspect the present invention consists in a self contained gas release device that can release a gas at a constant flow rate over a certain period of time, said device comprising;

a pressure vessel that contains a gas to be discharged there from, a valve for said pressure vessel to control the discharge of gas from said pressure vessel, said valve comprising (a) a body that includes a cylindrical body portion that has at least one circumferential groove formed into it, and where, within said groove there is at least one aperture that makes a fluid connection between the groove with the environment surrounding said device for discharging gas to pass through (b) an elastic gas permeable membrane that is located over said groove to interpose direct gas flow from said pressure vessel to said aperture so that gas must permeate through said membrane in order to discharge from said pressure vessel, said groove being of a profile to allow variable compliance of the membrane against at least part of the groove as a result of variation in pressure of the gas acting on the membrane wherein as the gas discharges and the gas pressure in the vessel decreases, the membrane releases from said groove to make available more surface area for the desorbtion of gas permeating through said membrane to increase the effective flow path for gas, and wherein by virtue of the decrease in pressure the gas discharge rate can remain substantially constant over a period of time.

Preferably the period of time includes time between 0.5 to 7 days.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features prefaced by that term in each statement all need to be present but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which:

FIG. 1 is a simplified cross section of a fluid release device having a fluid flow control valve with a dynamic membrane in a less restricted effective fluid flow path defining condition, FIG. 2 is a simplified cross section of part of a fluid release device having a fluid flow control valve with a dynamic membrane in a more restricted effective fluid flow path defining condition, FIG. 3 is a simplified cross section of part of a fluid release device having a fluid flow control valve with a dynamic membrane in an intermediately restricted effective fluid flow path defining condition, FIG. 5b is an end view of the cap in the fluid flow control valve, FIG. 9 is a cross section of a fluid release device that includes a "push-in" fluid flow control valve, FIG. 9a is a perspective view of a variation of FIG. 9, FIG. 9b is a sectioned perspective view of FIG. 9a, FIG. 9c illustrates the fluid release device in perspective, in section, associated with a reservoir, FIG. 10 is a cross section of a fluid release device that includes a "push-out" fluid flow control valve.

DETAILED DESCRIPTION OF THE INVENTION

Figure 4:
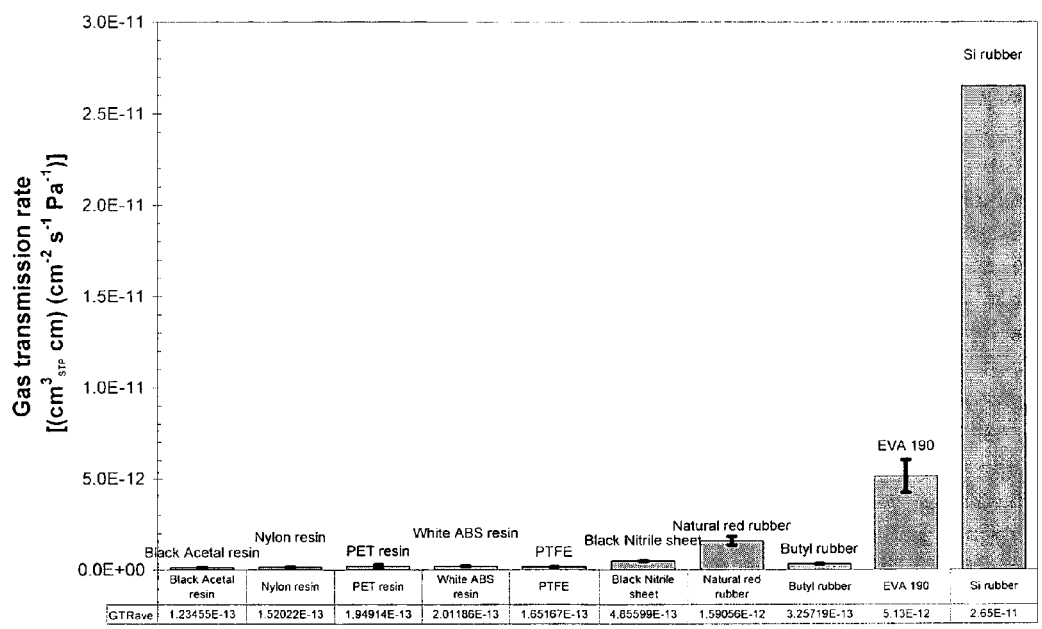
FIG. 4 is a graph of the ethylene gas transmission rate of a range of rubber and resin membranes, showing the comparatively high rate of silicone.

As used herein the term "storage reservoir" refers to a container, tank, canister, capsule or similar to hold a pressurised and/or concentrated fluid that preferably may be or may include ethylene.

As used herein the term "fluid" refers to a substance capable of flowing and may include a gas and a gas that may be liquefied. Typical fluids for release by the fluid release device may include ethylene, propylene, fumigants such as methyl bromide and ethylene oxide, insecticides such as pyrethrin and synthetic pyrethroids, pheromones, corrosive gases such as hydrogen fluoride that would react with metal components in conventional flow regulators, aroma-releasing fluids for medicinal and recreational use, such as menthol and eucalyptus, medicines and anaesthetics.

As used herein the term "surrounding environment" refers to the environment to which the fluid is released from the fluid release device. The environment may comprise a ripening container such as a clamshell, pallet or euro-box for holding a plant material. Intervening processing of the fluid such as a mixing with other substances or other flow control other than that herein described may occur between the storage reservoir and the surrounding environment.

As used herein the term "absorb" and the related terms "absorption" and "absorptive" refer to the process wherein atoms, molecules or ions of a fluid enter to permeate through a membrane.

As used herein the term "desorb" and the related terms "desorption" and "desorptive" refer to the process wherein atoms, molecules or ions of a fluid leave a membrane, and includes exudation of atoms, molecules or ions of a fluid from a membrane.

As used herein the term "membrane" refers to a fluid permeable barrier provided to be operative between the fluid reservoir and the surrounding environment. As will be understood from the following description the membrane need not be of a film-like or planar configuration.

As used herein the term "passively transition" refers to geometrical adjustment of the membrane in response to a changing pressure differential.

As shown in FIGS. 1-3, the fluid release device (1) may generally be said to include a fluid flow control valve (2) and a fluid storage reservoir (3). More preferred forms of the device (1) are described below. FIGS. 1-3 describe salient features of the invention.

The reservoir (3) is a pressure vessel that can store gas (or liquefied gas) at a pressure greater than the surrounding atmosphere. In use, the reservoir (3) is in fluid communication with the valve (2) but any such fluid communication between the valve (2) and reservoir (3) may be disrupted by a flow valve (4). One or more fluid flow passages may extend between the reservoir (3) and valve (2). Alternatively the enclosed space of the reservoir 3 may in part be defined by part of the valve (2).

The valve (2) includes at least one outlet such as outlet (6) to allow fluid to be released from the reservoir (3). Such release may be direct release from the device (1) to the surrounding environment or to another reservoir or cavity.

Fluid is released from the reservoir (and on the basis that, if provided, the flow valve (4) is open) under the control of the fluid flow control valve (2).

The flow characteristics of fluid through the valve (2) are a factor of the pressure differential across the valve.

The fluid flow control valve (2) includes a permeable membrane (7) through which gas can permeate. It also includes a flow path restrictor such as a flow path control surface 8 for the membrane.

Preferably the membrane (7) has at least one first surface that is exposed to the fluid on the reservoir side 1. The surface(s) (9) is an absorption surface through which fluid from the reservoir first passes to permeate through the body of the membrane.

Preferably the membrane (7) has at least one second surface (10) that is in fluid communication with the outlet (6). The surface(s) (10) is a desorption surface through which fluid that has permeated through the membrane from the absorption surface(s), passes to be discharged through the outlet (6).

Preferably the membrane is a dynamic membrane that passively transitions under influence of a pressure differential between the reservoir and the surrounding environment between: (i) a first pressurised differential (A1>A2 FIG. 2) where the valve has a first effective flow path (10) for fluid to pass through and (ii) a second pressure differential that is less than the first (A3<A1 FIGS. 2 and 3) wherein the valve 2 has a second effective flowpath (10) therethrough that is of a greater desorption area (FIG. 3) than the first (FIG. 2).

This is preferably achieved by the provision of at least one flow path restrictor such as the surface (8) with which the membrane dynamically cooperates.

The restrictor changes the effective flowpath size of the valve. A restrictor may act on one or both of the absorption surface and desorption surface to change their effective free surface area. A change in effective area is directly proportional to the flowpath size and hence the flow rate through the membrane.

In FIGS. 1-3, the desorption surface (10) is presented to in part be able to press against the control surface (8.) In the condition shown in FIG. 1 the desorption surface in fluid communication with the outlet 6 is larger than in FIGS. 2 and 3. Hence a higher flowrate can be expected for a given pressure differential across the valve.

The interaction of the membrane with the control surface(s) is dependent on the pressure differential across the valve. As the membrane is a dynamic membrane and is located between the higher pressure reservoir side fluid and the lower pressure and effectively constant pressure surrounding atmosphere, a change in pressure of fluid in the reservoir will change the interaction of the membrane with the restrictor(s). In the configuration shown in FIGS. 1-3 a drop in pressure differential will at least partially release the membrane from the control surface and increase the exposed desorption surface area thereby increasing the fluid flowpath area.

The appropriate selection of membrane rigidity, thickness, unloaded shape, positioning relative to the control surface(s) and the appropriate selection of control surface shape can allow the desired fluid release profile over time to be achieved. This can be easily modelled using appropriate software tools.

Gas permeation through a membrane may occur due to three factors; the first is the rate of absorption of the gas onto the surface of the membrane, the second is the permeation of the gas through the structure of the polymer, and the third is the rate of desorption of the gas off of the surface of the membrane.

Preferably the fluid release profile is such that over a period of time it is substantially constant. This period of time is preferably a substantial period of time of the total duration of release of fluid from the device in use.

Accordingly the dynamic membrane allows for a linear release rate of the fluid from the reservoir.

If a constant release rate isn't required, the rigidity, upload shape, positioning relative to the control surface shape can be modified to allow whatever fluid release profile desired (increasing or decreasing rate).

In a preferred embodiment of the present invention the fluid flow control valve is attached to or integral with a reservoir containing ethylene, thereby providing an ethylene release device for use in the conditioning of plant material. Desirably in this preferred embodiment the permeable membrane is comprised of silicone rubber because of the permeability characteristics of silicone rubber referred to herein.

FIG. 4 is a graph of the ethylene permeability of a range of rubber and resin membranes. The tests indicate that transmission rates through silicone elastomer is significantly faster than other rubbers (e.g. EVA 190, Natural red rubber).

For the fruit ripening application of the device of the invention the ethylene transmission rate of the membrane may be of the order of $2.5 \times 10^{-11}$ cm$^3$ per cm thickness of material per cm$^{-2}$ s$^{-1}$ Pa (this is the volume of ethylene that travels through a given membrane thickness in a certain time (seconds) under a pressure differential on a given membrane area). A silicone elastomer with 30 to 70 shore hardness is a material that meets these requirements.

The ethylene release devices of the present invention can be portable and efficacious and may store the required amount of pure ethylene to ripen fruit with a full flavour in conventionally packed fruit in individual cartons (about 0.12 g total ethylene). These devices containing (2.5 g total ethylene) may be suitable for in-transit conditioning, or alternatively may be sealed within a plastic-covered pallet to condition fruit "to order" over a 1-5 day period at ambient temperature in small batches.

During conditioning, a device may be placed into a carton or covered pallet and the ethylene is then released at a constant rate over a substantial portion of the release time. This encourages the maintaining of for example about 100 ppm ethylene inside the carton or covered pallet for a specified number of days depending on requirements. For example, the device of the present invention can release 20 mg hr$^{-1}$ of C$_2$H$_4$ to the atmosphere for a period of say 5-7 days to maintain a concentration of not less than 100 ppm in an enclosed volume corresponding to a pallet of pears wrapped in a polyethylene liner.

Immediately after the required conditioning time, ethylene can automatically and rapidly be dumped from the device, such as by an avalanche valve that may be incorporated in the device.

Some specific embodiments of the device will now be described as examples.

Ethylene Release Device Incorporating O-ring Membrane

Figure 5:
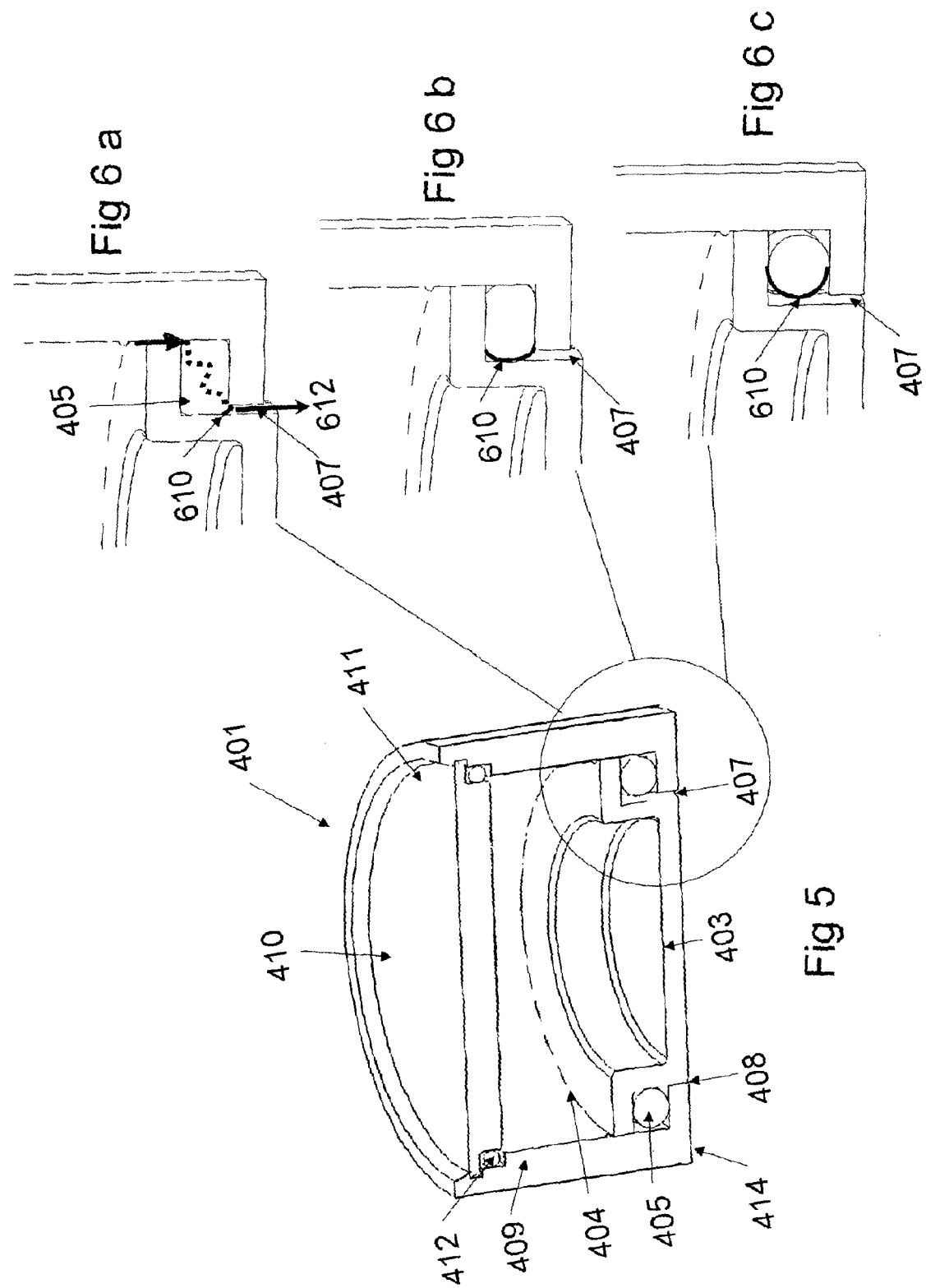
FIG. 5 is a cross-section view of a fluid release device having a fluid flow control valve with an O-ring shaped membrane.

FIG. 5 depicts one embodiment of an ethylene release device 401 in which the valve includes a dynamic O-ring shaped membrane 405 and a piston 403 slideably located in a cylindrical bore that may form part of or be in fluid communication with a fluid reservoir 409. The membrane 405 is sandwiched between the piston 403 and a lower rim 414 of the valve. The reservoir may be hermetically closed by a lid 410 fitted into a snaplock groove 411 and sealed by a nitrile o-ring 412. The O-ring creates a gas impermeable seal between 411 and 409 and may be chosen from such materials as nitrile rubber.

Ethylene stored in the reservoir 409 passes through aperture 404 to contact and be absorbed into the silicone O-ring membrane 405. The ethylene permeates through the O-ring membrane 405 and is desorbed from the O-ring membrane 405 to release into the surrounding environment via the annular vent 408.

When the device is fully loaded with ethylene, the O-ring membrane 405 is under compression by the piston and between the piston 403 and the lower rim 414 thereby reducing the absorption surface area and/or desorption surface area of the O-ring membrane available to the ethylene. This restricts the rate of release of ethylene from the device into the surrounding environment.

As the ethylene is released, the internal pressure in the reservoir 409 decreases. The pressure exerted via the piston 403 on the O-ring 405 will decrease, permitting the compressed O-ring membrane to expand and force the piston 403 upwards. This increases the absorption surface area and/or desorption surface area of the O-ring membrane 405 available to the ethylene. This enhances the rate of release of ethylene from the device into the surrounding environment and compensates for the expected reduction in ethylene release rate as ethylene is released and the internal pressure drops, in order to maintain a constant overall fluid release rate.

Figure 6:
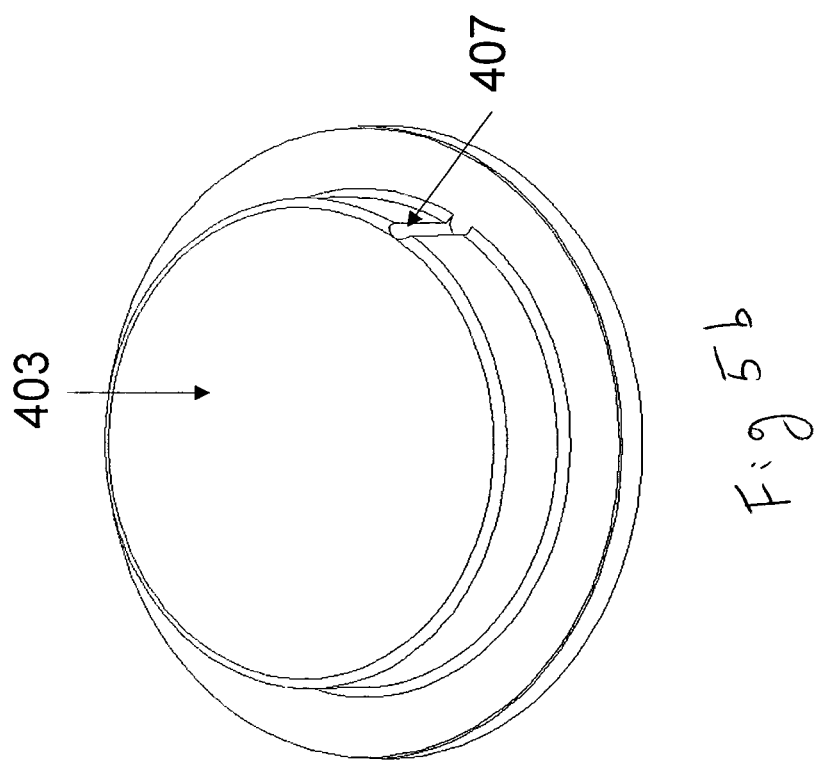
FIGS. 6a-c show cross-section views of part of the valve of FIG. 5 illustrating the effect of a decreasing pressure differential on the piston and membrane.

FIGS. 6a-c show a silicone rubber O-ring membrane within an ethylene release device. FIGS. 6a-c illustrate the shape changes of the O-ring membrane as the internal pressure decreases.

When the device is fully loaded with ethylene at say 8 bar (stage 1 in FIG. 6a), the compressed O-ring membrane completely fills the surrounding cavity and seals on all four walls of the housing as well as the cross vent. In this configuration, ethylene 612 passes between the inside reservoir wall and the piston, permeates through the compressed silicone O-ring membrane and desorbs from the desorption surface 610 of the membrane and is released through the cross vent groove 407 between the reservoir and piston.

As ethylene is released, the piston moves upwards and the O-ring membrane becomes more circular and retracts from some or all four corners of the housing. This exposes a progressively larger surface area of O-ring membrane to the ethylene in the reservoir. The resulting enhanced absorption of ethylene from the reservoir into the O-ring membrane and an increased surface area for desorption 610 compensate for the falling pressure of ethylene in the reservoir, so that the rate of ethylene release through the O-ring membrane may remain constant.

The pressure over which control is exercised can be modified as illustrated by the vertical groove 415 in 403 (FIG. 5). The nitrile O-ring 412 created an airtight seal between 411 and 409.

At about 2-3 bar internal gas pressure (FIG. 6b), the O-ring membrane may retract from the cross vent groove 407 and the ethylene that has accumulated in the inner/upper piston cavity escapes to atmosphere. This exposes a larger desorption surface 610 of the membrane to the surrounding environment and also creates a shorter path for ethylene release through the O-ring membrane.

As the gas pressure continues to decrease (FIG. 6c), the O-ring membrane may retract from both side walls of the cavity to provide further shorter pathways for ethylene escape through the O-ring membrane.

An Ethylene dump safety mechanism is provided by the top and/or bottom and/or side(s) of the O-ring disengaging the housing and releasing any residual ethylene. This mechanism:

(i) Ensures safe disposal of potentially explosive ethylene gas,
(ii) Controls the length of the conditioning period, and
(iii) Reduces the potential for on-going collateral damage to nearby fruit.

For gas-dumping to occur effectively, rapid release of the residual ethylene from the reservoir is needed.

This mechanism occurs at about 1 bar internal pressure, the seals on the top and bottom of the O-ring membrane may be released and residual ethylene rapidly and completely empties from the reservoir.

Figure 8:
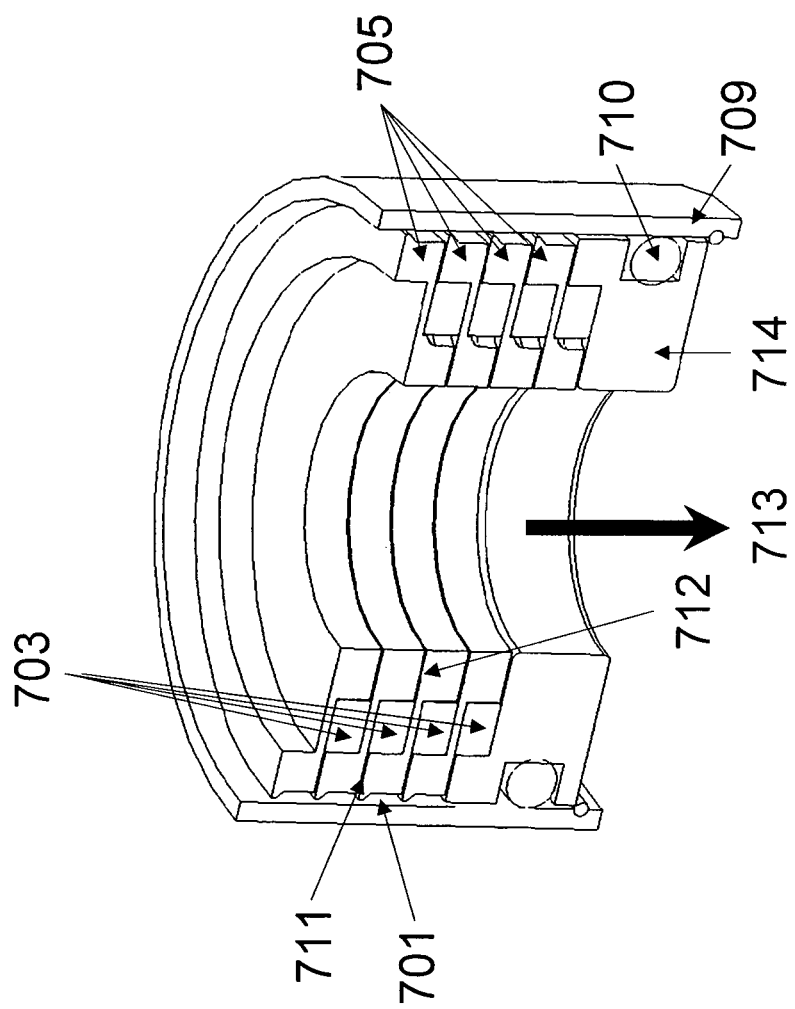
FIG. 8 is a cross-sectional perspective view of part of the valve of FIG. 7.

Ethylene release devices of the present invention may comprise a plurality of O-ring membranes 703, each O-ring membrane is sandwiched between spacing members 705 as depicted in FIG. 8. By increasing the number of O-ring membranes the release rate of ethylene may be changed. The flow path for the ethylene is downwards through a gap 701 between the inner surface of the cylindrical bore 709 and the spacer members 705, between upper and lower surfaces of the spacer members 705 then permeates through the O-ring membranes 703 and through the gap between spacer members 705 exiting through the central passage 713. The nitrile o-ring 710 seals the gap between the body 714 and the outer wall 709. The same principle of operation applies between end members 606, 609 and adjacent spacer members 605.

Figure 7:
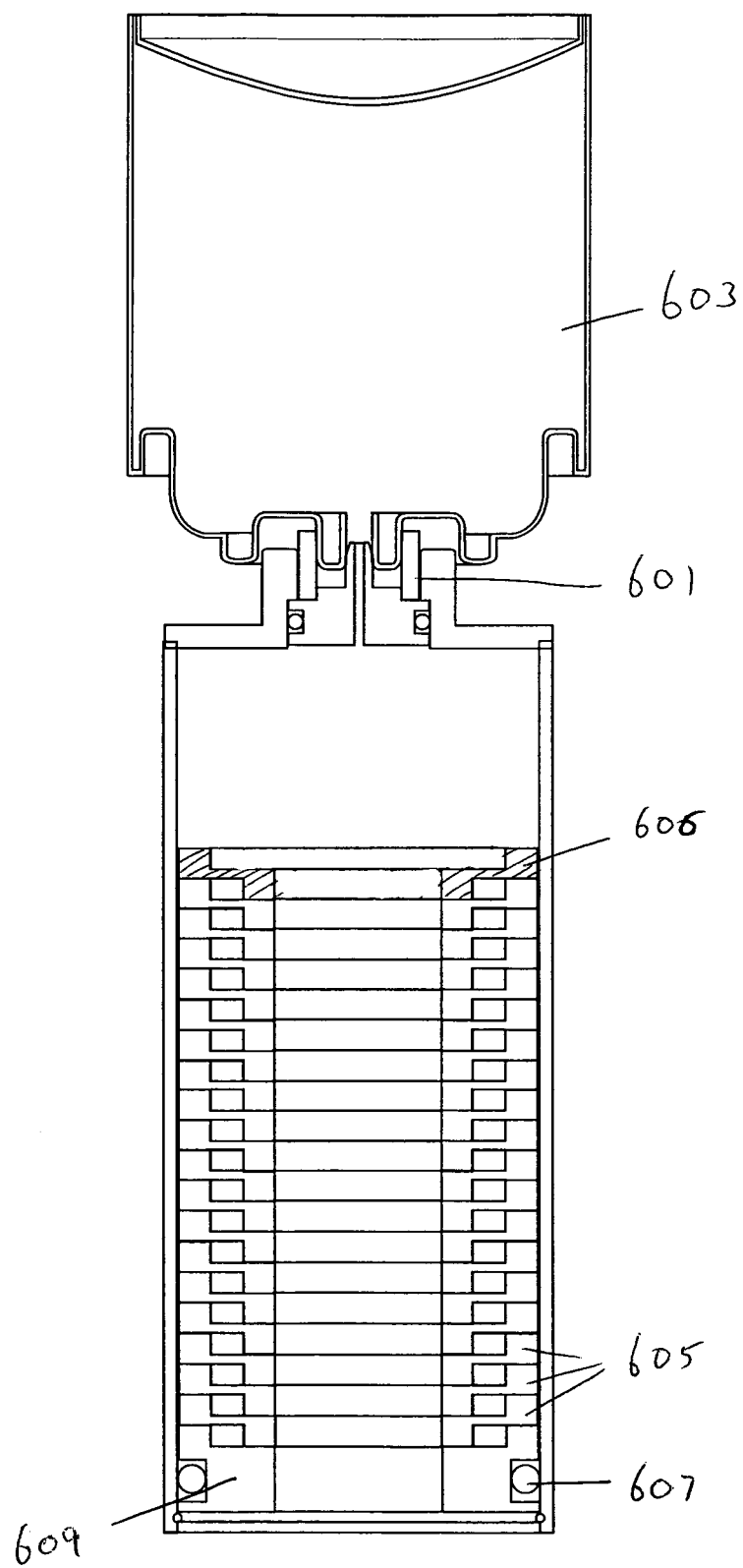
FIG. 7 is a cross-section view of a fluid release device having a fluid flow control valve with twenty O-ring shaped membranes connected to a separate ethylene reservoir.

The valve shown in FIG. 7 is suitable for attaching to a pressurised capsule 603 via connector 601. Alternatively the valve may be integral with the ethylene storage reservoir.

Ethylene Release Device Incorporating Sleeve Membrane

FIG. 9 depicts another preferred embodiment of an ethylene release device 180 in which the valve includes a dynamic silicone rubber sleeve membrane 183. One end of the sleeve membrane 183 may be closed, although preferably both ends of the sleeve membrane 183 are open. In a first configuration the sleeve membrane is arranged in a "push-in" configuration. The valve includes a hollow cylinder 185 having an internal bore 189. The cylinder 185 is fitted inside a silicone rubber sleeve 183. The ethylene gas 182 permeates inwardly through the silicone then passes through an orifice 187 into the hollow interior bore 189 of the cylinder 185 that is vented to atmosphere.

The valve is designed with one or more circumferential grooves 184 to implement the geometric effect described above. The compliance of the silicone rubber sleeve 183 allows it to form to the shape of the groove 184 under the influence of a pressure differential. The surface of the groove 184 in contact with the silicone sleeve 183 acts as a flow path restrictor and inhibits desorption of gas from the surface of the silicone sleeve. Additionally or alternatively the edges of the orifices 187 may also implement the geometric effect described above.

The pressure differential is created by the difference between the pressure within the reservoir and the atmospheric pressure. As ethylene is released from the silicone rubber sleeve 183 the pressure decreases, and the elastic properties of the silicone rubber sleeve 183 begin to overcome the pressure differential so that the silicone begins to pull away from the internal surface of the bore 185, thus exposing a greater surface area of the sleeve membrane for desorption of gas and hence at least partially overcoming the decreasing pressure differential.

Figure 9E:
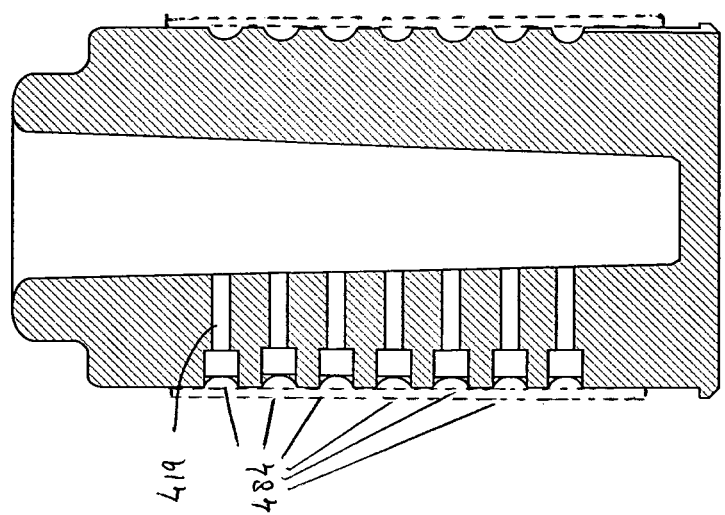
FIG. 9e is a sectional view of the fluid release device shown in FIG. 9d.
Figure 9D:
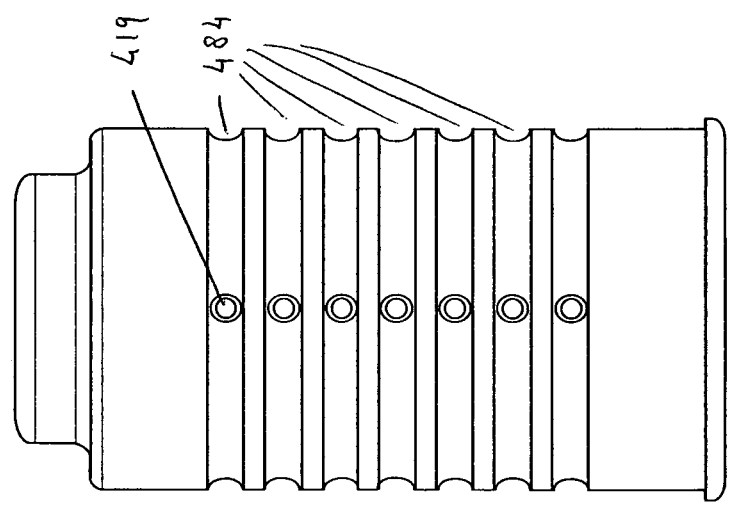
FIG. 9d is a front view of the fluid release device of FIG. 9a, showing a 7 groove embodiment.

With reference to FIGS. 9A-9E there is shown a variation of the valve of the present invention. This valve is like the "push-in" valve of FIG. 9 and includes a cylindrical body 400 that may be located within a pressure vessel 410 as shown in FIG. 9C. The body includes a cylindrical outer surface 411 about which an elastic sleeve such as a silicone rubber sleeve (shown in phantom) can locate in a snug manner. The body includes a cavity 412 that can be positioned to be in direct or indirect fluid communication with an outlet of or with opening 413 of the pressure vessel 410 or directly to the exterior of the ethylene release device 483. The cylindrical body includes at least one and preferably a plurality of grooves 484 that are spaced apart in an axial direction along the body 400. The grooves are all covered by the silicone sleeve. Each of the grooves is in fluid connection with the cavity 412. Such fluid connection is preferably provided by at least one aperture 419 between the cavity 412 and a respective groove. Each groove may be part circular or U-shaped in cross-section as shown in FIGS. 9D and 9E or may be V-shaped in cross-section or other non-circular shape. The grooves are each of a profile to allow for the silicone membrane to be compliant to the curve of the groove. Under high pressure differential the silicone sleeve will be fully compliant with the profile of each of the grooves. Under such high pressure gas permeates through the silicone membrane only at the aperture 419 of each groove. As the pressure reduces and the silicone sleeve pulls away from contacting some of the surface of each of the grooves, additional desorption surface area becomes available for the passage of gas through the silicone sleeve. The depth and width of the grooves may be formulated so that the membrane would experience sufficient normal pressure at the maximum envisaged operating pressure to ensure that the initial release rate would be determined by the exposed membrane over the aperture of each groove. A wider groove may result in a region of the membrane at the centre of the circumferential groove that may not lift off until very low pressures. A groove that is too narrow may result in the groove from becoming blocked e.g., with a membrane of 0.8 mm thick, the membrane in the groove channel could, if sufficiently deep, require a channel of at least 1.6 mm in width otherwise the membrane may interfere with itself.

For performance of the device, work needs to be extracted from the membrane by it becoming initially stretched under pressure from the gas in the reservoir. The membrane then carries potential energy under such a loaded condition. The membrane material, under high pressure, is forced into each groove under pressure where it becomes compliant with the shape of the groove. The elasticity of the material aids in its return to a non-contact position as the pressure decreases. The return force may be increased by increasing the deformation of the membrane. Practically, this may be achieved by increasing the depth of the grooves. A limit to this arises from the fact that the membrane is being stretched axially to accommodate the extra distance to the groove surface, but it is concurrently being forced to assume a smaller circumference than the natural, un-stretched circumference of the membrane sleeve. Therefore a very deep groove can result in undesirable wrinkling effects on the membrane when an isostatic pressure is applied forcing it to form the geometry of the underlying body.

The entrance of each aperture may be modified to prevent, under high pressures, the silicone from plugging into the aperture, if this may occur and if this may provide an undesirable release profile. Such modification may include the positioning of a highly permeable but rigid or semi-rigid body at the entrance to the aperture 419. Preferably the apertures are of a size to substantially extend the width of the groove. If the aperture is of insufficient width compared to the groove, the membrane may form a plug into the aperture and may remain there even whilst other parts of the membrane are lifting off the groove surface.

Figure 16:
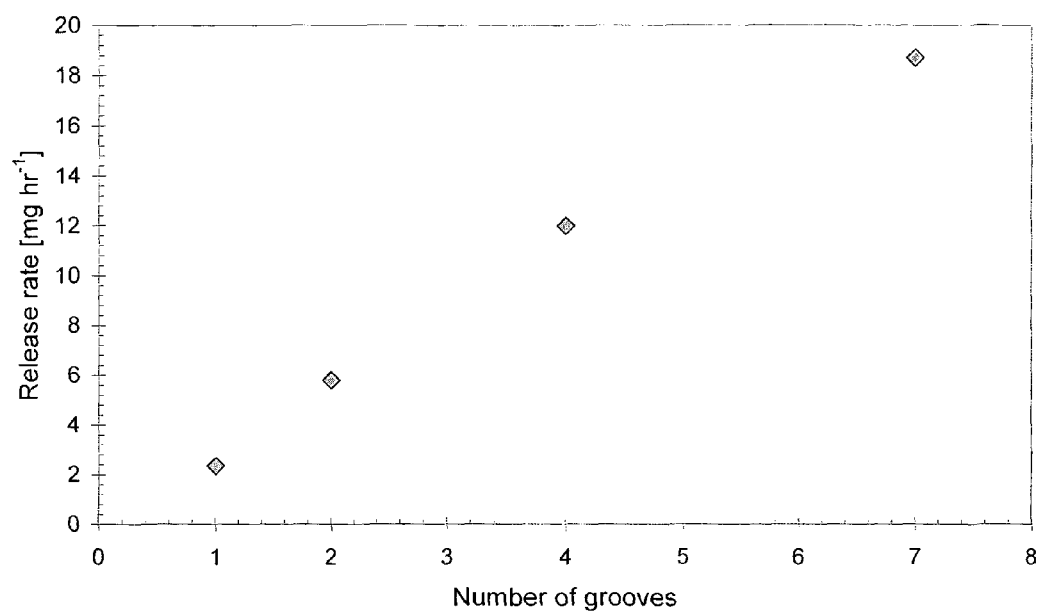
FIG. 16 is a graph showing the release rate for constant rate discharge for base units as shown in FIG. 9A-9E.

By changing the number of grooves or the diameter of the body, different release rates can be achieved. The overall release rate is easily programmed by simply duplicating the base unit of a single groove. FIG. 16 shows the results for 1, 2, 4 and 7 unit devices.

The body may be approximately 36 mm in overall length and approximately 19 mm in diameter. The grooves may be of a width of approximately 1.8 mm and approximately 0.6 mm deep. Each aperture may be up to 1.7 mm in diameter. The silicone sleeve that may be used may be approximately 0.8 mm thick. The pitch between the grooves may be 3 mm.

The valve shown in FIGS. 9A-9C also includes an avalanche valve defined by a slot. The avalanche slot 436 is preferably also covered by the silicone sleeve (AdvantaPure: APST-0750-0813P) The avalanche slot can create a fluid connection between the interior of the pressure vessel 410 and the cavity 412 via the end most groove 440 and its associated aperture. The avalanche valve is formed by the shallow slot 436 that is cut from, the end extremity of the cylindrical body 400 to the closest groove. This provides a direct route for venting the gas within the pressure vessel to the outside atmosphere when a threshold pressure level is reached with depressing pressure within the pressure vessel.

This groove is of a shape to allow compliance of the silicone membrane with the groove. The silicone membrane remains compliant with the shape of the groove to close passage of fluid through the groove from the containment region 414 of the pressure vessel 410 to the cavity 412 until close to the end of the discharge of the gas from the pressure vessel. The ethylene is discharged from the cavity through puncturing of the cap 413 or through a valve fitted to the cap. Not until a substantial amount of the gas has been discharged, will the silicone displace from the surface of the groove to thereby create a direct passage for gas to be released from the containment region.

With reference to FIG. 9c it can be seen that the valve of the present invention may be accommodated within a pressure vessel 410. The valve may in fact be accommodated within a standard aerosol can and may be inserted through a standard opening of aerosol can. This can provide the benefit that the valve is provided in a protected environment within the aerosol can and is therefore protected from any damage that it may otherwise sustain if thrown into a container for operation for a period of days.

FIG. 10 depicts a "push-out" configuration ethylene release device 190 in which a valve 196 having an internal dynamic silicone rubber sleeve membrane 193 is attached to a gas reservoir 191. The device operates in a similar fashion to the device depicted in FIG. 9. The ethylene 192 flows from the reservoir 191 into the valve 196 where it permeates through the silicone membrane 193 and is released through apertures 197. A higher pressure inside the device than outside the device biases the sleeve membrane against the flow path restrictor 195. The flow path restrictor 195 has grooves 194 to implement the geometric effect described above. As the ethylene is released the pressure differential across the membrane decreases and the sleeve retracts from the flow path restrictor 195 exposing a greater surface area of the sleeve membrane for desorption of gas and hence at least partially overcoming the decreasing pressure differential.

Without being limited to any particular theory, it is believed that two stages predominantly control the ethylene release rate. These can be broadly categorised into effects as a result of high and of intermediate pressure ranges.

At the initial high pressures, the dominating contribution to gas permeation is the pressure driven diffusion across the membrane to the desorption area available in the exposed slot area. This area is fixed, and as such, can be described as an exponentially decreasing permeation rate.

As the silicone elastomer begins to pull away from the surface as the pressure decreases, a second effect takes place whereby an extra desorption surface area becomes available in the ever widening cavity between the silicone and the groove. Once this cavity has a path to the atmosphere via the slot, then the overall gas flow is augmented by this secondary contribution.

The flow rate is linearised by ensuring that the increase in desorption surface area is sufficient to overcome the reduction in permeation due to the reduced pressure differential. The maximum extra desorption area is fixed by the circumference of the silicone sleeve and is essentially limited to the area of the groove.

For a given silicone sleeve thickness and initial gas pressure, the desired release rate (for example 20 mg hr$^{-1}$) is simply a function of the slot area. To permit this release rate to be linear however requires a final desorption surface area such that the release rate at the final decreased pressure gradient substantially equals the initial release rate. This desired characteristic is not achieved by simply increasing the slot length, as the silicone compliance is not scaled similarly, and to do so would require a thicker tubing wall, which would subsequently lead to a reduction in diffusion rate, this being contrary to the main objective.

The desired release characteristics can be obtained by scaling the diameter of the tubing used, for example an increase in tubing diameter leads to a greater circumference which means a greater surface area for desorption and increased rate as the pressure decreases through the intermediates range.

Figure 11:
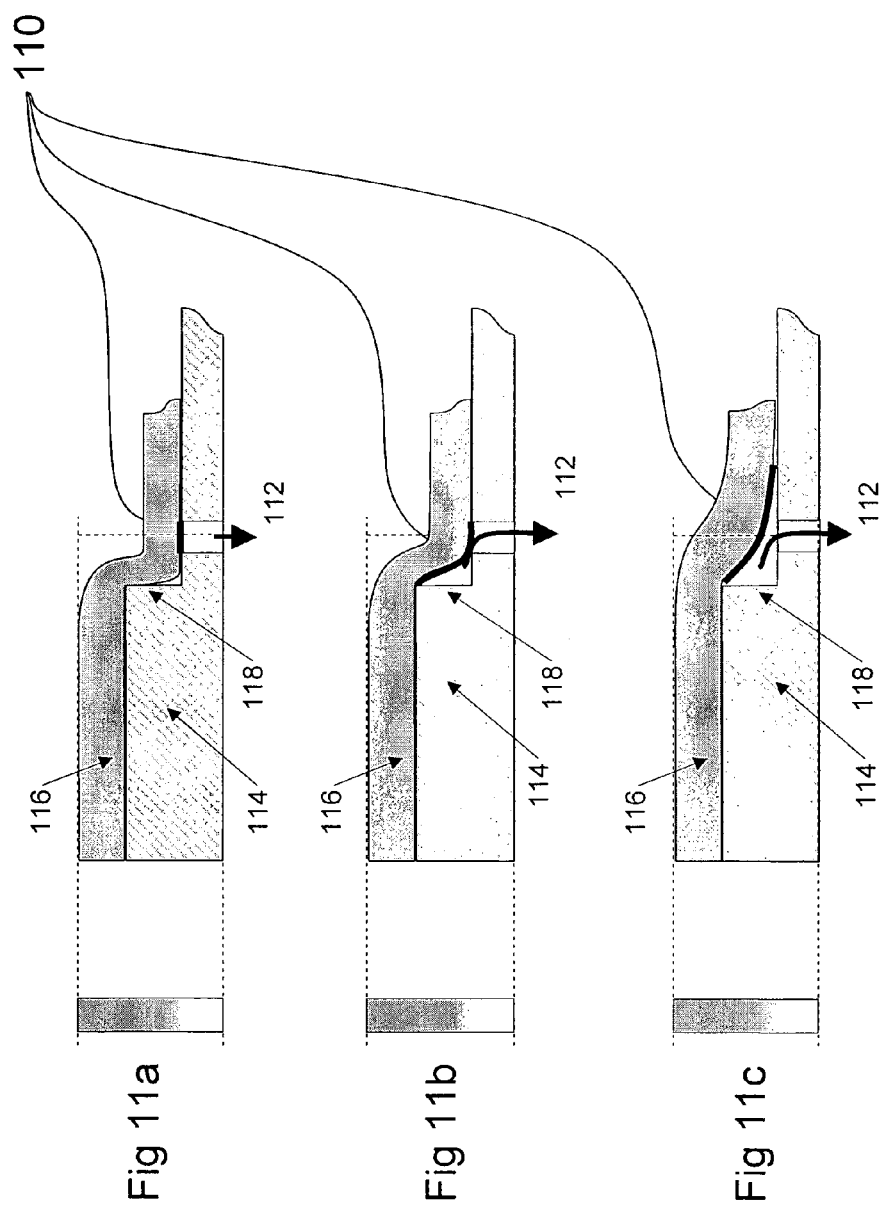
FIGS. 11a-c are schematic diagrams of a part of a fluid release device that is of a "push-out" or "push-in" type, that show different parts of the membrane producing different release profiles contributing to a flow linear release profile.

FIG. 11 is a schematic diagram of a push-in valve illustrating the theorised mechanism by which a desired release rate is obtained. A flow path restrictor 114 has a groove 118 so that the desorption area increases at an increasing rate as the pressure decreases. Additionally a vent hole (not shown) passing through the flow path restrictor 114 may be incorporated so that when the silicone sleeve has relaxed back to its unstressed position at sufficiently low pressure, then a perforation in the silicone is activated so that the residual gas pressure can be vented to the atmosphere in a short time span to reduce the possibility of unwanted ethylene release beyond the desired release time.

FIG. 11a depicts the valve in a high pressure condition where the release of ethylene is driven by pressure diffusion through the slot 115. The membrane 116 is biased against the flow path restrictor 114 to define a small desorption surface area 110 for release of ethylene to the surrounding environment.

FIG. 11b depicts the valve in an intermediate pressure condition where the membrane 116 has partially retracted from the flow path restrictor 114 to reveal a larger desorption surface area 110 for release of ethylene release to the surrounding environment.

FIG. 11c depicts the valve in a low pressure condition where the membrane 116 has further retracted from the flow path restrictor 114 to reveal a larger desorption surface area 110 for release of ethylene release to the surrounding environment.

The number and/or size of the slots in the valve and/or the thickness and/or surface area of the membrane can be varied according to the desired gas release profile. By increasing the number of slots or the size of the slots the release rate of the gas is increased.

Figure 12:
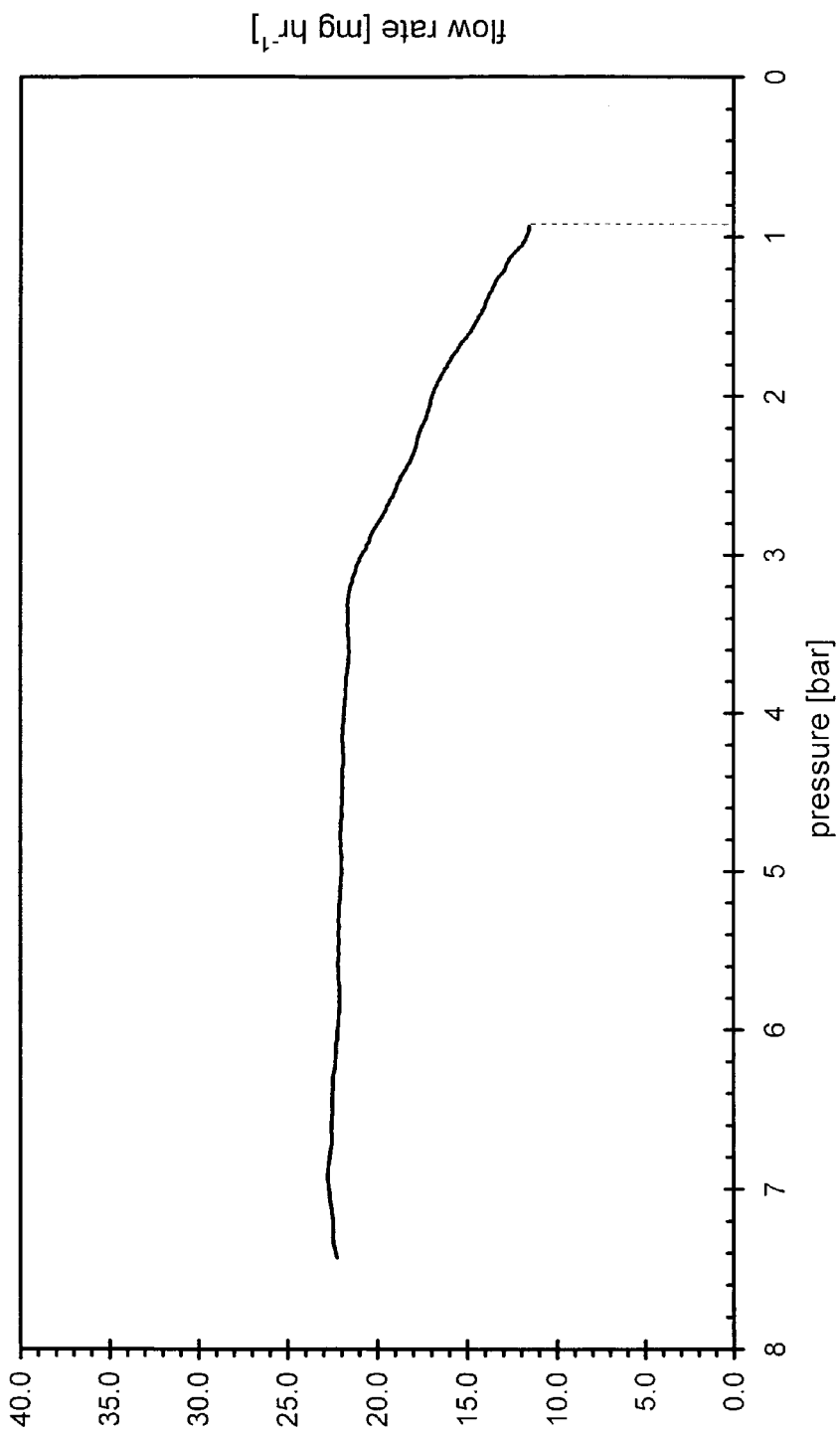
FIG. 12 is a graph of the flow rate of a fluid from a fluid release device with a "push-in" fluid flow control valve as the pressure of the fluid within the device decreases.

FIG. 12 shows the substantially linear release rate of ethylene from a "push-in" fluid release device of FIG. 9 as the presure inside the device decreases. At about 1 bar pressure a sudden and complete release of ethylene ("avalanche release") from the device into the environment is observed.

Figure 13:
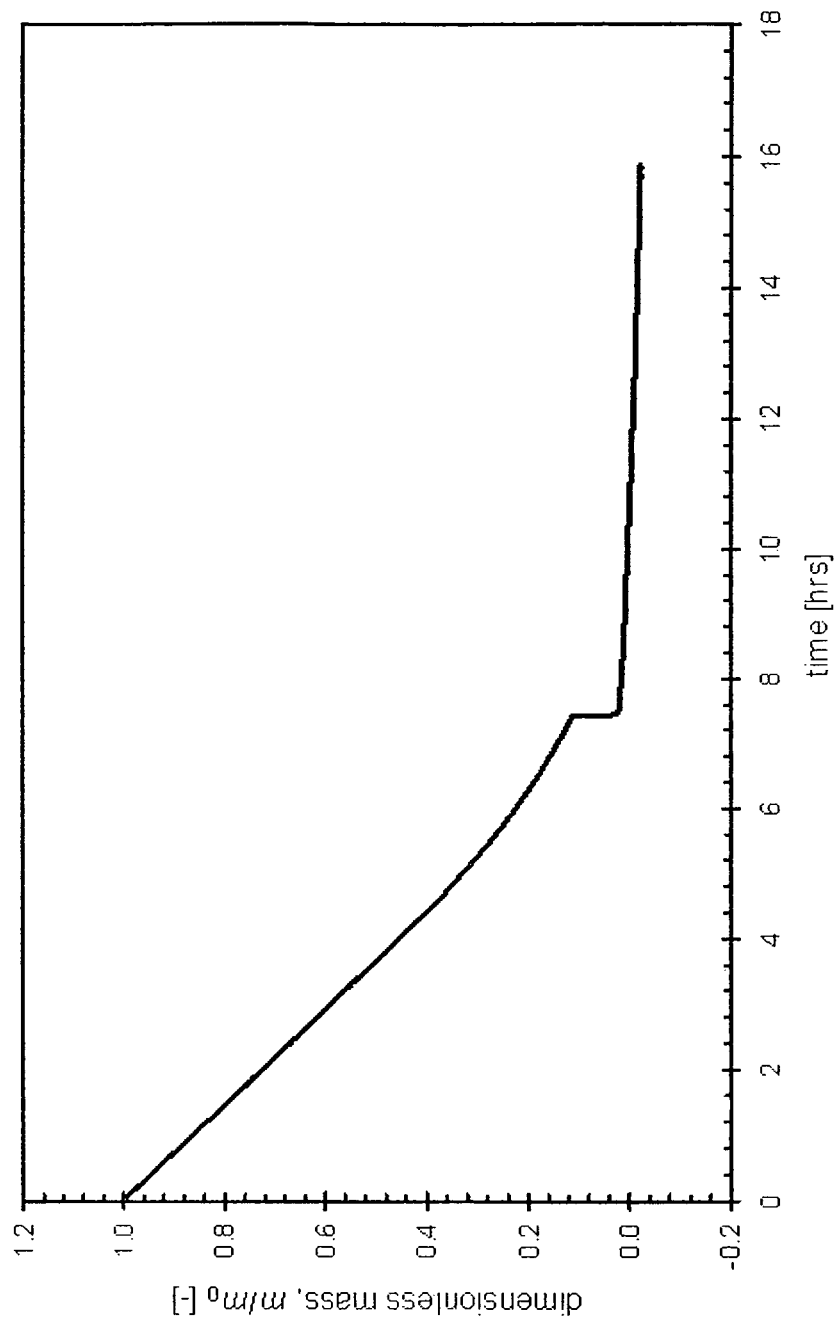
FIG. 13 is a graph of the mass data for a fluid release device with a "push-in" fluid flow control valve during release of ethylene gas.

FIG. 13 shows decreasing mass of a "push-in" fluid release device of FIG. 9 over time a ethylene is released. The mass linearly decreases for approximately 7.5 hours. The sudden drop in mass at about 7.5 hours corresponds to the avalanche release of ethylene observed in FIG. 12.

Figure 14:
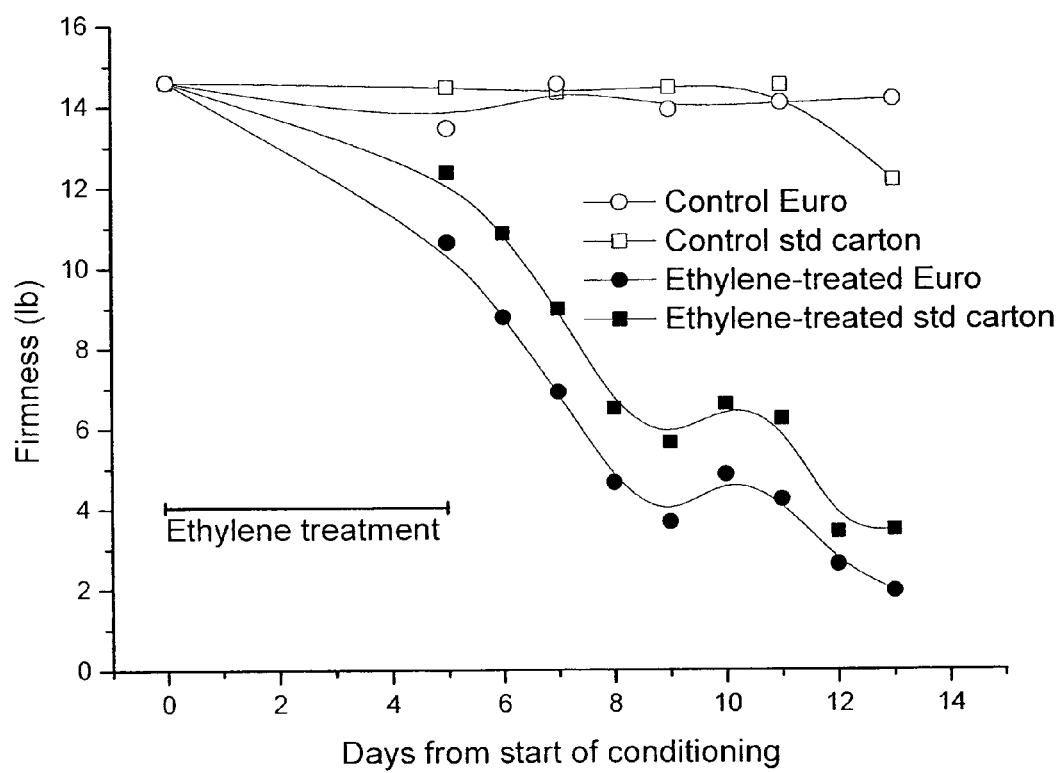
FIG. 14 is a graph of the firmness of pears contained in Euro-boxes and standard cartons with and without exposure to ethylene released from a fluid release device.
Figure 15:
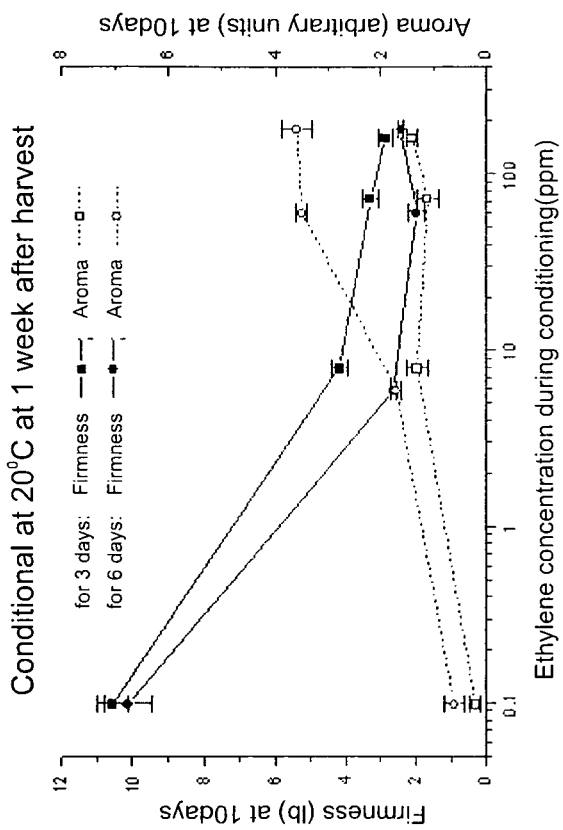
FIG. 15 is a graph of the effect of concentration of ethylene, achieved by injecting ethylene into sealed conditioning chambers preloaded with unripe fruit, and length of conditioning period on firmness and aroma of Green Anjou pears at 20° C.

FIG. 14 shows the effects on firmness of an exposure of pears to a 5 day ethylene conditioning treatment. Fruit in mixed pallets of double layer Euro-packs and standard cartons where sealed inside a 80 µm plastic film. Ethylene release devices configured to release ethylene over a 5 day period where placed inside a first sealed pallet. A second sealed pallet was a control and had no ethylene release devices included. The flesh of the fruit exposed to the ethylene release devices softened and ripened significantly while the control fruit displayed minimal ripening.

The device of the present invention may also employ shaping of both the impermeable substrate and permeable membrane together. In other words, the membrane, as for example used with reference to the device in FIGS. 9a-9e, may not be cylindrical but could be flat and the surface features that control the flow rate by virtue of the elastic properties, may be on either or both of the membrane and/or the impermeable substrate.

An advantage of controlled release gas device as per the present invention, compared to uncontrolled release systems may come into effect when, a) the minimum active gas concentration for a prolonged time is required to achieve effectiveness, b) the active gas concentration spontaneously declines significantly with time, perhaps due to absorption in produce, or due to auto-oxidation, c) excessive levels of active gas damage the produce (e.g. that simply putting in high levels of gas at the start of a treatment is unacceptable). The device of the present invention has the advantage of being self-contained and that it can be placed inside a container with no further access required. The avalanche release feature, if incorporated, will ensure that the high contents of the pressure vessel is discharged so that when the device is disposed of, no dangerous levels of gas remain present within the pressure vessel.

Industrial Application

The system, apparatus and method of the invention may be used to condition plant material such as fruit or vegetables by releasing ethylene in an environment in which the fruit or vegetables are contained. Examples of typical environments occur throughout the processing chain of plant materials from harvest to the end consumer and include clamshells, euroboxes and bushel boxes, pallet load of boxes or container loads of pallets. Typically these environments will be shrouded with a conventional perforated apple box liner or a disposable plastic pallet cover to substantially contain the ethylene about the plant material.

The device of the present invention may be disposable and can be manufactured at low cost.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention. For example the method of and capsules for ripening plant material can include traditional mechanical valves controlled manually or electronically.

While the use of valves of the present invention has been described with respect to plant conditioning, it will be appreciated that the valves can be used in a wide variety of situations where the flow of a fluid is to be controlled, for example gas tanks for releasing insecticides, fumigants or fragrances at a constant rate.

In addition, where features or aspects of the invention are described in terms of Markush groups, those skilled in the art will recognise that the invention is also thereby described in terms of any individual member or subgroup of members of the Markush group.

What is claimed is:

1. A fluid flow control valve, suitable for controlling the flow rate of fluid to the surrounding environment from a fluid storage reservoir that includes a fluid outflow passage for fluid that is at a higher pressure inside of said reservoir than the surrounding environment, said fluid flow control valve comprising:
an elastic fluid permeable membrane to control the flow of fluid through said passage,
said membrane comprising
an absorption surface to absorb a fluid from the reservoir into said membrane, and
a desorption surface to desorb a fluid from said membrane to the surrounding environment;
wherein said membrane is subjected to pressure proportional to the pressure differential between the reservoir and the surrounding environment, to vary its characteristics by virtue of its elastic nature to thereby vary the effective fluid flow path between the reservoir and the surrounding environment.

2. A fluid release device that comprises a reservoir with which there is associated a fluid flow control valve as claimed in claim 1.

3. A method for conditioning plant material comprising:
containing a plant material in an environment that is at least partially gas-tight; and exposing the plant material to fluid released from a fluid release device as claimed in claim 2 to condition the plant material.

4. A method for conditioning plant material comprising exposing the plant material to a concentration of ethylene gas released from a fluid release device as claimed in claim 2 to condition the plant material, the plant material exposed to between about 1 ppm to about 250 ppm for time between around 0.5 day to 14 days.

5. A fluid release valve comprising a fluid permeable membrane provided between a fluid storage reservoir and the surrounding environment, said membrane configured to control at least one of:

the rate of absorption of the fluid onto the surface of the membrane;

the rate of permeation of the fluid through the membrane; and the rate of desorption of the fluid from the surface of the membrane to the environment, wherein said membrane is subjected to pressure proportional to the pressure differential between the reservoir and the surrounding environment, to vary its characteristics by virtue of its elastic nature to thereby vary the effective fluid flow path between the reservoir and the surrounding environment.

6. A fluid release valve suitable for regulating a flow of fluid from a fluid reservoir, said fluid release valve comprising a body member including:

(i) an inlet, and (ii) an outlet in fluid communication with the inlet via a flow passage;

(iii) a fluid permeable membrane extending across the flow passage to restrict the flow of fluid between said inlet and outlet; and (iv) an impervious flow path restrictor;

wherein the flow path restrictor and the membrane are configured and adapted operationally to interact with each other to allow the flow of fluid along the flow path as a function of the quantity of fluid in the fluid reservoir.

7. A fluid release valve as claimed in claim 6 wherein the flow rate of fluid along the flow path may be controlled by the interaction of the flow path restrictor and the membrane to be substantially constant.

8. A fluid release valve as claimed in claim 6 or 7 wherein it includes a closure member for closing the flow passage so that no fluid may flow through it.

9. A fluid release valve as claimed in claim 6 wherein it includes the fluid reservoir.

10. A fluid release valve as claimed in claim 6 wherein the flow path restrictor is displaceable between a restricted barrier position in which the restriction is engaged more with said membrane whereby the fluid flow passage is more restricted, and a less restricted barrier position in which the restriction is engaged less with said membrane whereby the fluid flow passage is less restricted.

11. A fluid release valve as claimed in claim 6 wherein the membrane is displaceable between a restricted barrier position in which the membrane engages more with said flow path restrictor whereby the fluid passage is more restricted, and a less restricted barrier position in which the membrane is engaged less with said flow path restrictor whereby the fluid flow passage is less restricted.

12. A fluid release valve as claimed in claim 6 wherein the fluid reservoir is pressurised in relation to the surrounding environment and the membrane and flow path restrictor interact with each other to vary the effective flow path through said passage by virtue of the pressurised fluid.

13. A fluid release valve as claimed in claim 6 wherein the interaction of the flow path restrictor and the membrane is such that the flow path is more restricted when the pressure in the fluid reservoir is high, and the flow path is less restricted when the pressure in the fluid reservoir is relatively lower.

14. A fluid release valve as claimed in claim 6 wherein the flow rate of fluid along the flow path is controlled by the interaction of the flow path restrictor and the membrane to be substantially constant over time until the quantity of fluid in the fluid reservoir has reached a predetermined lower threshold, after which the flow path is not restricted by the interaction of the membrane and/or the flow path restrictor, and an uninterrupted passage is established between any remaining fluid in the reservoir and the surrounding environment.

15. A fluid release valve as claimed in claim 6 wherein the flow path restrictor is located adjacent the membrane to allow a variable amount of contact therebetween to vary the permeation of fluid through the membrane.

16. A fluid release valve as claimed in claim 15 wherein the flow path restrictor is disposed proximal more the inlet of the passage relative the membrane, said flow path restrictor presented to interact with said membrane to influence the absorbtion of fluid into the membrane.

17. A fluid release valve as claimed in claim 6 wherein the flow path restrictor is disposed proximal more the outlet of the passage relative the membrane to interact with said membrane to influence the desorbtion of fluid from said membrane.

18. A fluid release valve as claimed in claim 6 wherein the flow path restrictor and the membrane are moveable relative to each other and come into variable degree of contact to deform the membrane so as to restrict permeation of the fluid through the membrane.

19. A fluid release valve as claimed in claim 6 wherein the membrane is composed of an elastically resilient material.

20. A fluid release valve as claimed in claim 19 wherein the membrane is composed of material selected from the group of elastomeric polymers comprising silicone, synthetic hydrocarbon, natural rubber and any combinations thereof.

21. A fluid release valve as claimed in claim 6 wherein the flow path restrictor is of a non permeable material.

22. A fluid release valve as claimed in claim 6 wherein the flow path restrictor is composed of an inelastically resilient material.

23. A fluid release valve as claimed in claim 6 wherein the fluid in the fluid reservoir is a gas.

24. A fluid release valve as claimed in claim 23 wherein the gas is selected from of ethylene, propylene, methyl, cyclopropene, pyrethin or synthetic pyrethroids, ethylene oxide, methyl bromide, pheromones, fumigants, pesticides, carbon dioxide, sulphur dioxide or any similar gas or gas mixture containing one of these gases as an ingredient.

25. A fluid release valve as claimed in claim 23 wherein the gas may include anaesthetic, propulsion, fragrance, aroma, flavour, and corrosive properties.

26. A fluid release valve as claimed in claim 6 wherein the membrane is in the form of a planar film.

27. A fluid release valve as claimed in claim 6 wherein the membrane is a hollow sheath.

28. A fluid release valve as claimed in claim 6 wherein the flow path restrictor is defined by a body having a cavity that is in fluid communication with the surrounding environment and with at least one opening to the cavity that is in fluid communication with said fluid in said reservoir via said membrane.

29. A fluid release valve as claimed in claim 28 wherein the body includes a hollow cylindrical portion.

30. A fluid release valve as claimed in claim 29 wherein the hollow sheath is configured and dimensioned to fit snugly around at least part of the cylindrical portion and fluid pressure can act on the sheath to bias it against the hollow body.

31. A fluid release valve as claimed in claim 29 or 30 wherein formed at the cylindrical region is at least one annular channel into which the membrane, under pressure from said fluid may be forced yet be resiliently biased in a direction out of the channel.

32. A fluid release valve as claimed in claim 31 wherein the cylindrical region includes a plurality of annular channels.

33. A fluid release valve as claimed in claim 31 wherein the fluid pressure can act against the sheath's elasticity to encourage the sheath to
(a) conform to the channel or channels at higher reservoir fluid pressures, thereby restricting the flow of fluid through the apertures in the hollow tube; and
(b) retract at least partially from contact with the channel or channels at lower pressures thereby reducing the restriction on the fluid flow.

34. A fluid release valve as claimed in claim 29 wherein the body includes a pressure release passage formed into an outer surface of the body and with which said sleeve can interact to become compliant therewith under higher fluid pressure thereby closing said passage and which can enable unrestricted fluid communication of the fluid reservoir with the surrounding environment at a predetermined lower fluid threshold pressure.

35. A fluid release valve as claimed in claim 6 wherein the fluid release valve, in use, provides a substantially linear fluid flow profile over a substantial portion of time of operation of the device.

36. A method for conditioning plant material comprising:
providing a fluid release valve as claimed in claim 6 that is associated with a pressurised fluid reservoir in an environment that is at least partially fluid-tight and that contains plant material; and
exposing the plant material to fluid from the fluid release valve over a time period.

37. The method as claimed in claim 36 wherein the time period is between around 0.5 to 14 days.

38. The method as claimed in claim 36 wherein the time period is 5 days.

39. The method as claimed in claim 36 wherein the fluid released by the fluid release valve is ethylene.

40. The method as claimed in claim 39 wherein the at least partially fluid-tight environment comprises a covered container that restricts the dispersion of the gas to permit an accumulation of ethylene gas internally while remaining sufficiently vented to the air so as to maintain a beneficial environment for fruit to be receptive to ethylene.

41. The method as claimed in claim 40 wherein the plant material is retained in the environment with a concentration of ethylene gas of between about 1 ppm to about 250 ppm for a time period of between half a day to 7 days.

42. The method as claimed in claim 40 wherein the plant material is retained in the environment with a concentration of ethylene gas of between about 100 ppm and 200 ppm for 2 to 5 days.

43. A method for ripening plant material in transit comprising
at least partially enclosing the plant material in an isolated environment;
loading the plant material onto a transportation means;
providing a fluid release valve as claimed in claim 6 that is associated with a pressurised fluid reservoir, within the cover; and
retaining the plant material in the isolated environment that includes fluid released by the fluid release valve from said reservoir over a period of time.

44. A method as claimed in claim 43 wherein the plant material is a fruit.

45. A gas release device comprising or including
a reservoir of pressurised gas to be released,
a passageway from said reservoir to an outlet,
an elastic gas permeable membrane in the passageway and/or at the outlet that allows gas release only via the membrane to, or from, the outlet, and
a gas impermeable member in said passageway that includes a gas permeable member interface positioned to contact said gas permeable membrane,
wherein displacement of the gas permeable membrane is responsive to the pressure of the gas in the reservoir such that there is a greater interfacial contact between the gas impermeable member and said gas permeable membrane at a higher gas pressure than at lower pressure to thereby vary the exposed cross sectional area of the permeable membrane available to the flow in an inverse relationship to pressure.

46. A gas release device as claimed in claim 45 wherein the gas permeable membrane is elastic.

47. A gas release device as claimed in claim 45 or 46 wherein the gas impermeable member is rigid.

48. A gas release device as claimed in claim 46 wherein the gas permeable membrane elasticity at the interface is to reduce the interfacial contact with said gas impermeable member as the pressure decreases.

49. The method as claimed in claim 45 wherein the gas permeable membrane is responsive in a progressive manner.

50. A method of packaging fruit comprising, placing in a container that holds or is to hold fruit, a cartridge comprising a gas release device as defined in claim 45 containing a fixed quantity of ethylene that can be activated to release ethylene at a constant flow rate over a period of time and activating the cartridge and shipping the container with fruit contained therein to a destination.

51. A container containing fruit that includes a cartridge comprising a gas release device as defined in claim 45 containing a fixed quantity of ethylene that can be activated to release ethylene at a constant flow rate over a period of time and activating the cartridge and shipping the container with fruit contained therein to a destination.

52. A self contained gas release device that can release a gas at a constant flow rate over a period of time, said device comprising;
a pressure vessel that contains a gas to be discharged therefrom, and
a valve for said pressure vessel to control the discharge of gas from said pressure vessel, said valve comprising
(a) a body that defines (i) an aperture for discharging gas to pass through to the environment surrounding said device and (ii) a control surface; and
(b) an elastic gas permeable membrane interposing direct gas flow from said pressure vessel to said aperture so that gas must permeate through said membrane in order to discharge from said pressure vessel, said membrane located adjacent said control surface to, at lower gas pressure of said gas, form a passage between said control surface and said aperture that is of a greater size than at higher gas pressure where said membrane is more compliant to the shape of the control surface by virtue of a higher gas pressure biasing the membrane against said control surface.

53. A self contained gas release device that can release a gas at a constant flow rate over a certain period of time, said device comprising;
 a pressure vessel that contains a gas to be discharged there from, and
 a valve for said pressure vessel to control the discharge of gas from said pressure vessel, said valve comprising
  (a) a body that includes a cylindrical body portion that has at least one circumferential groove formed into it, and where, within said groove there is at least one aperture that makes a fluid connection between the groove with the environment surrounding said device for discharging gas to pass through; and
  (b) an elastic gas permeable membrane that is located over said groove to interpose direct gas flow from said pressure vessel to said aperture so that gas must permeate through said membrane in order to discharge from said pressure vessel, said groove being of a profile to allow variable compliance of the membrane against at least part of the groove as a result of variation in pressure of the gas acting on the membrane wherein as the gas discharges and the gas pressure in the vessel decreases, the membrane releases from said groove to make available more surface area for the desorbtion of gas permeating through said membrane to increase the effective flow path for gas, and wherein by virtue of the decrease in pressure the gas discharge rate can remain substantially constant over a period of time.

54. A device as claimed in claim 52 or 53 wherein the period of time includes time between 0.5 to 7 days.

55. The method as claimed in claim 36 wherein the fluid in the fluid reservoir is a gas selected from of ethylene, propylene, methyl, cyclopropene, pyrethin or synthetic pyrethroids, ethylene oxide methyl bromide, pheromones, fumigants, pesticides, carbon dioxide, sulphur dioxide or any similar gas or gas mixture containing one of these gases as an ingredient,

56. The method as claimed in claim 55 wherein the gas may include anaesthetic, propulsion, fragrance, aroma, flavour, and corrosive properties.

* * * * *

UNITED STATES PATENT AND TRADEMARK OFFICE
CERTIFICATE OF CORRECTION

PATENT NO. : 8,657,254 B2  Page 1 of 1
APPLICATION NO. : 12/446220
DATED : February 25, 2014
INVENTOR(S) : Cate et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this

Twenty-ninth Day of September, 2015

Michelle K. Lee
*Director of the United States Patent and Trademark Office*